(12) United States Patent
Wang et al.

(10) Patent No.: US 10,042,529 B2
(45) Date of Patent: Aug. 7, 2018

(54) CONTENT DISPLAY WITH DYNAMIC ZOOM FOCUS

(71) Applicant: Microsoft Technology Licensing, LLC, Redmond, WA (US)

(72) Inventors: Shen Wang, San Jose, CA (US); Cheng-kai Chen, Fremont, CA (US); Alexandre Gueniot, Mountain View, CA (US); Jeffrey Chen, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 14/246,596

(22) Filed: Apr. 7, 2014

(65) Prior Publication Data

US 2015/0277714 A1 Oct. 1, 2015

Related U.S. Application Data

(60) Provisional application No. 61/973,647, filed on Apr. 1, 2014.

(51) Int. Cl.
*G06F 3/0485* (2013.01)
*G06F 3/0484* (2013.01)
*G06F 3/0483* (2013.01)

(52) U.S. Cl.
CPC ........ *G06F 3/04845* (2013.01); *G06F 3/0483* (2013.01); *G06F 3/04842* (2013.01); *G06F 3/04847* (2013.01); *G06F 2203/04806* (2013.01)

(58) Field of Classification Search
CPC combination set(s) only.
See application file for complete search history.

(56) References Cited

U.S. PATENT DOCUMENTS 5,790,122 A  8/1998  Cecchini et al.
5,914,716 A  6/1999  Rubin et al.
(Continued)

FOREIGN PATENT DOCUMENTS

CN   102915193 A   2/2013
EP     2631778 A2   8/2013

OTHER PUBLICATIONS

"International Search Report and Written Opinion Issued in PCT Patent Application No. PCT/US2015/022892", dated Jun. 15, 2015, 16 Pages.

(Continued)

*Primary Examiner* — Stephen Hong
*Assistant Examiner* — Hope C Sheffield

(57) ABSTRACT

Systems and methods are provided for displaying and presenting content. When presenting content in real time, contextual-zoom-focus and/or dynamic-zoom-focus may be placed on selected portions of the content. For example, the content may be zoomed and the selected portions of content may be repositioned to a central area of a display. Additionally, context may be maintained for the selected portions of content by at least partially displaying nearby content. In some cases, portions of content may be displayed in a progressive manner along a selected display path. Accordingly, context for the portions of content may be maintained along the display path. In some cases, placing contextual-zoom-focus and/or dynamic-zoom-focus on portions of content may be animated and the portions of content may perceptively zoom and glide into focus.

20 Claims, 30 Drawing Sheets

(56) References Cited

U.S. PATENT DOCUMENTS

| | | | |
|---|---|---|---|
| 6,426,761 B1 | 7/2002 | Kanevsky et al. | |
| 6,466,203 B2 | 10/2002 | Van Ee | |
| 6,587,119 B1* | 7/2003 | Anderson | H04N 5/23293 345/473 |
| 8,659,681 B2 | 2/2014 | Kim | |
| 2002/0113816 A1 | 8/2002 | Mitchell et al. | |
| 2006/0156228 A1 | 7/2006 | Gallo | |
| 2007/0192739 A1* | 8/2007 | Hunleth | G06F 3/0481 715/823 |
| 2008/0094367 A1 | 4/2008 | De Ven et al. | |
| 2009/0089707 A1 | 4/2009 | Knowles | |
| 2009/0300554 A1 | 12/2009 | Kallinen | |
| 2010/0315438 A1* | 12/2010 | Horodezky | G06F 3/0481 345/661 |
| 2011/0109581 A1* | 5/2011 | Ozawa | G06F 3/0481 345/173 |
| 2012/0081303 A1 | 4/2012 | Cassar et al. | |
| 2012/0311489 A1 | 12/2012 | Williams et al. | |
| 2013/0042199 A1 | 2/2013 | Fong et al. | |
| 2013/0111334 A1 | 5/2013 | Liang et al. | |
| 2013/0229347 A1 | 9/2013 | Lutz et al. | |
| 2013/0293572 A1 | 11/2013 | Kodimer et al. | |
| 2014/0282013 A1* | 9/2014 | Amijee | G06F 3/0482 715/732 |
| 2015/0277715 A1 | 10/2015 | Wang et al. | |

OTHER PUBLICATIONS

Garman, Dot, "Prezi—Zooming", Published on: May 22, 2013, Available at: https://www.youtube.com/watch?v=GfLZKGht6ek.

PCT International Search Report and Written Opinion in International Application PCT/US2015/022889, dated Jun. 24, 2015, 14 pgs.

Coron, Tammy, "How to Create a Slide-Out Navigation Panel", Published on: Apr. 10, 2013, Available at: http://www.raywenderlich.com/32054/how-to-create-a-slide-out-navigation-like-facebook-and-path, 20 pgs.

UI Element Guidelines: Windows, Published on: Sep. 28, 2013, Available at: https://developer.apple.com/library/mac/documentation/userexperience/conceptual/applehiguidelines/Windows/Windows.html, OS X Human Interface Guideleines, 49 pgs.

Yarmosh, Ken, "New iOS Design Pattern: Slide-out Navigation", Published on: Jan. 2, 2012, Available at: http://kenyarmosh.com/ios-pattern-slide-out-navigation/, 6 pgs.

Wark, Robin, "Improve Your PC Screen Work Space", Published on: Jul. 2011, Available at: http://www.paretologic.com/resources/newsletter/improve_your_pc_screen_work_space.aspx, 2 pgs.

Maximize Space by Auto-Hiding "the Ribbon in Office 2007", Published on: May 26, 2007, Available at: http://www.howtogeek.com/howto/microsoft-office/maximize-space-by-auto-hiding-the-ribbon-in-office-2007/, How-To Geek, 2 pgs.

PCT 2nd Written Opinion in International Application PCT/US2015/022892, dated Feb. 9, 2016, 10 pgs.

PCT 2nd Written Opinion in International Application PCT/US2015/022889, dated Feb. 25, 2016, 11 pgs.

U.S. Appl. No. 14/246,666, Office Action dated Dec. 18, 2015, 16 pgs.

U.S. Appl. No. 14/246,666, Amendment and Response filed Mar. 8, 2016, 19 pgs.

PCT International Preliminary Report on Patentability in PCT/US2015/022892, dated Jun. 2, 2016, 11 pages.

U.S. Appl. No. 14/246,666, Office Action dated Jul. 1, 2016, 18 pages.

PCT International Preliminary Report on Patentability in PCT/US2015/022889, Jun. 13, 2016, 12 pages.

U.S. Appl. No. 14/246,666, Amendment and Response filed Oct. 14, 2016, 20 pages.

U.S. Appl. No. 14/246,666, Office Action dated Dec. 29, 2016, 22 pages.

U.S. Appl. No. 14/246,666, Amendment and Response filed Mar. 29, 2017, 19 pages.

U.S. Appl. No. 14/246,666, Office Action dated Apr. 21, 2017, 22 pages.

U.S. Appl. No. 14/246,666, Amendment and Response filed Jul. 6, 2017, 21 pages.

U.S. Appl. No. 14/246,666, Advisory Action dated Oct. 4, 2017, 5 pages.

"Office Action Issued in European Patent Application No. 15719887.0", dated Mar. 13, 2018, 9 Pages.

* cited by examiner

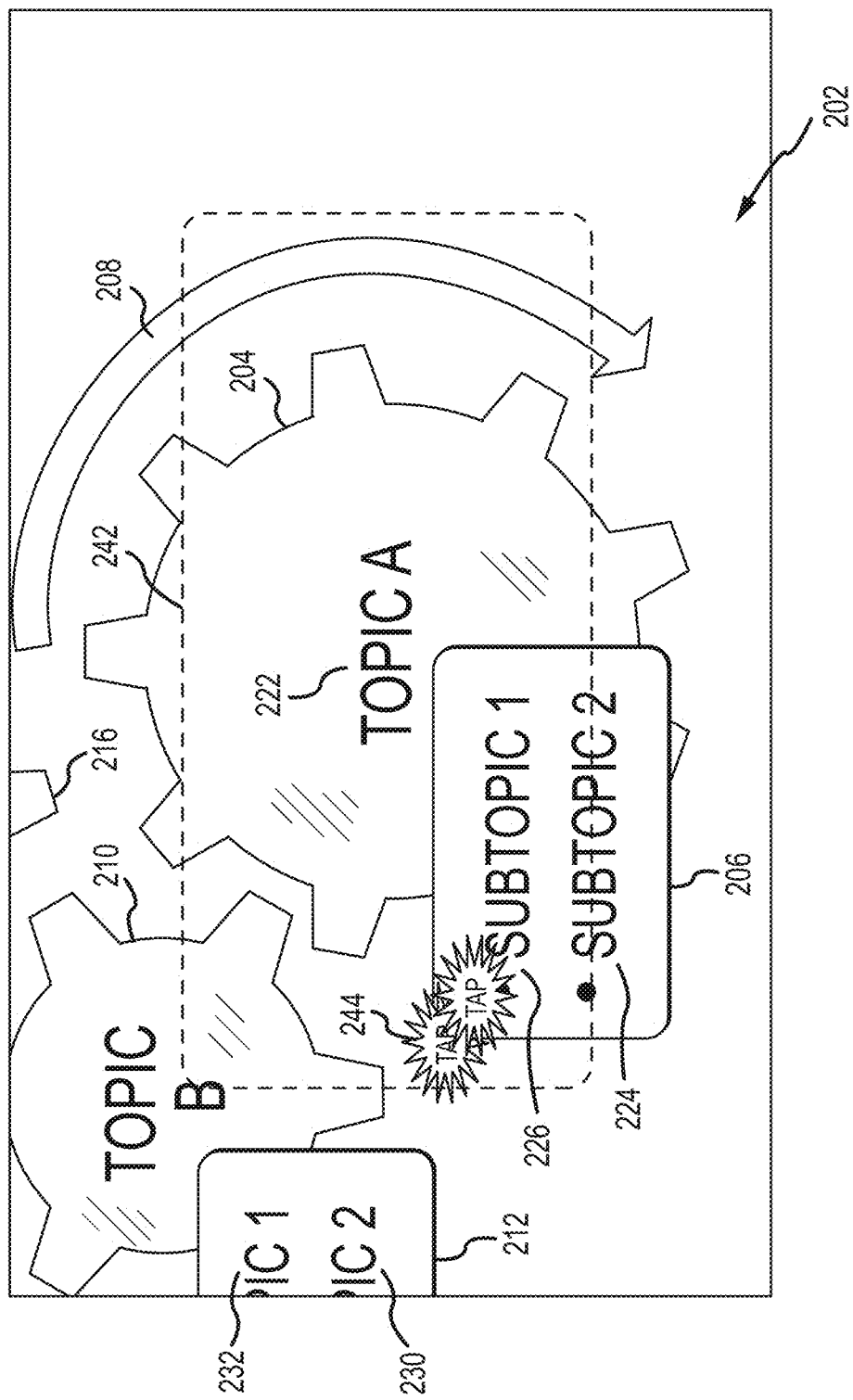

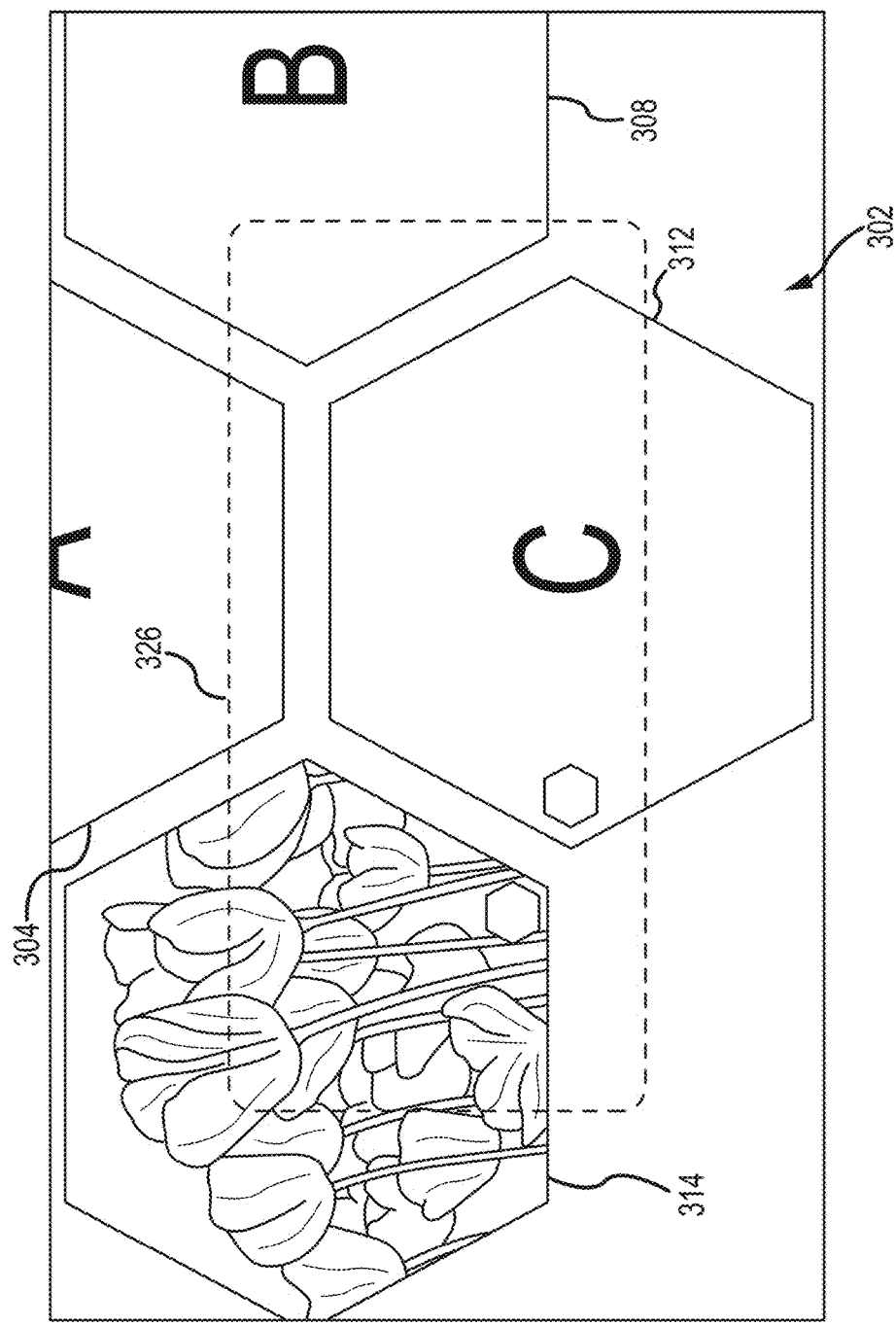

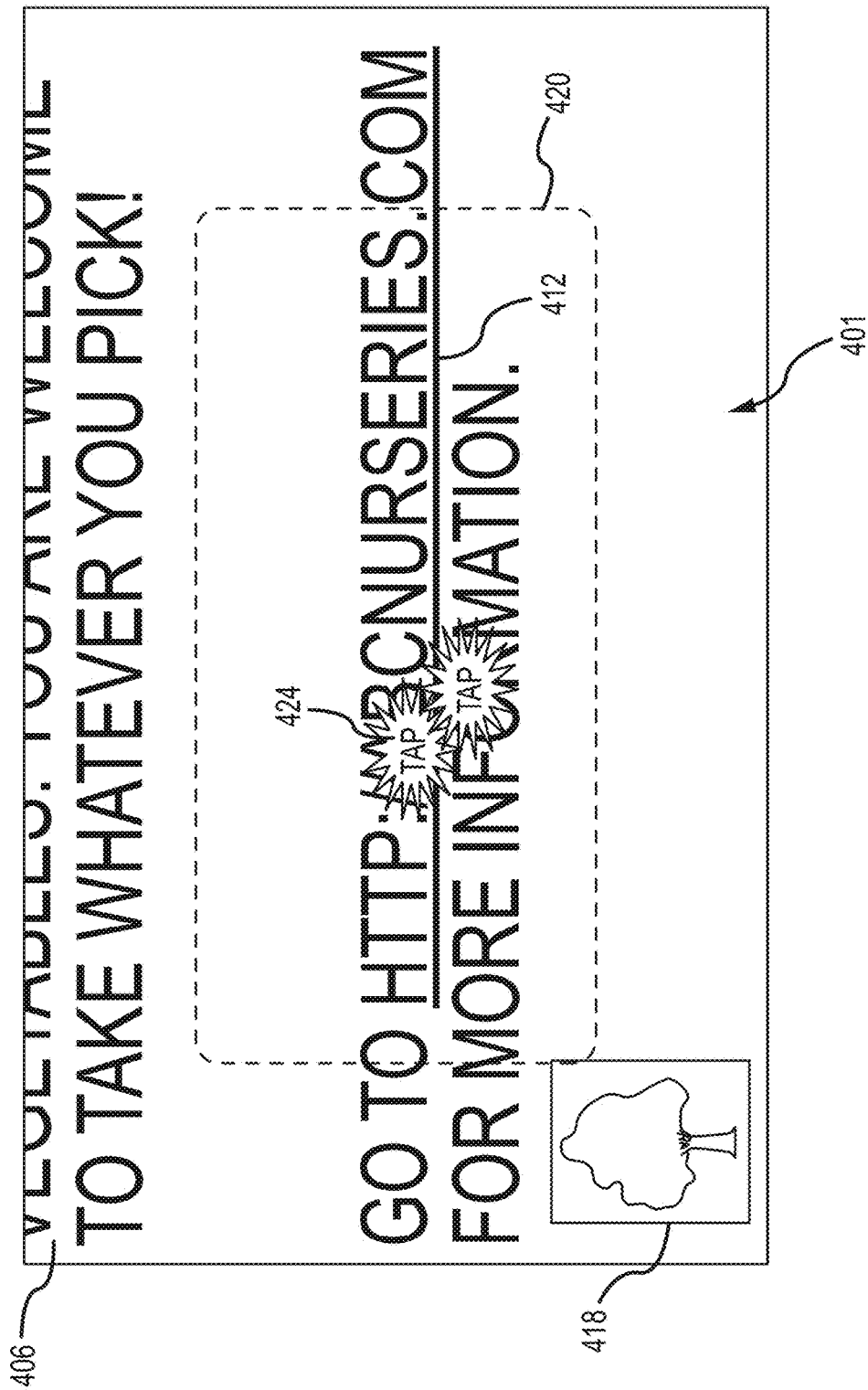

CONTENT DISPLAY WITH DYNAMIC ZOOM FOCUS

CROSS-REFERENCE TO RELATED APPLICATIONS

This application claims the benefit of U.S. Provisional Application Ser. No. 61/973,647, entitled "CONTENT DISPLAY WITH DYNAMIC ZOOM FOCUS," filed on Apr. 1, 2014, the entire disclosure of which is hereby incorporated herein by reference.

BACKGROUND

When content is displayed or presented, it can be difficult to focus an audience on a portion of content being discussed. That is, while applications exist for organizing content prior to a presentation, the applications do not provide a presenter with a way to easily guide and direct listeners, or emphasize and highlight aspects of the content, during the presentation.

It is with respect to these and other general considerations that embodiments have been made. Also, although relatively specific problems have been discussed, it should be understood that the embodiments should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In embodiments, a computer-implemented method for displaying content with a plurality of objects. The method includes displaying the plurality of objects in a window, where the plurality of objects have an arrangement. The method further includes receiving an indication of a path from a first object to a second object of the plurality of objects and placing dynamic-zoom-focus on the first object in the window. Additionally, the method includes following the path from the first object to the second object, and while following the path, displaying one or more of the plurality of objects along the path. The method further includes placing dynamic-zoom-focus on the second object in the window.

In further embodiments, a computer-readable storage medium having computer-readable instructions stored thereon is provided. The computer-readable instructions, when executed, cause a computer system to display an object in a window, where the object includes one or more elements in a first arrangement. Further, at least one of the one or more elements includes one or more sub-elements in a second arrangement. Moreover, the computer-readable storage medium includes computer-readable instructions for receiving an indication of a first path from a first element to a second element of the one or more elements. In embodiments, the computer-readable storage medium includes computer-readable instructions for placing dynamic-zoom-focus on the first element in the window and maintaining context for the first element in the window. Additionally, the computer-readable storage medium includes computer-readable instructions for following the first path from the first element to the second element, placing dynamic-zoom-focus on the second element in the window, and maintaining context for the second element in the window.

In still further embodiments, a computer system comprising at least one processing unit and at least one memory is provided. The at least one memory of the computer system further has computer-readable instructions stored thereon that, when executed by the at least one processing unit, cause the computer system to display a plurality of objects in a window, where the plurality of objects have an arrangement. The computer system further receives an indication of a path from a first object to a second object of the plurality of objects and places dynamic-zoom-focus on the first object in the window. Additionally, the computer system follows the path from the first object to the second object and places dynamic-zoom-focus on the second object in the window.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the claims.

BRIEF DESCRIPTION OF THE DRAWINGS

FIGS. 2A-2C illustrate embodiments of displaying content with contextual zoom focus in a slide presentation.

FIGS. 3A-3D illustrate embodiments of displaying content by adjusting a zoom level.

FIGS. 4A-4D illustrate embodiments of displaying content with contextual zoom focus in a document.

DETAILED DESCRIPTION

As disclosed herein, when displaying or presenting content, it may be desirable to emphasize less than all of the content. For example, it may be desirable to emphasize particular aspects of content or to guide a discussion from one object to another during a presentation. In other cases, it may be desirable to increase a size of a portion of content for improved viewing or clarity of the object.

Systems and methods are provided herein for displaying and presenting content. When presenting content in real time, focus may be placed on selected portions of the content. For example, the content may be zoomed and the selected portions of content may be repositioned to a central area of a display. Additionally, context may be maintained for the selected portions of content by at least partially displaying nearby content. In some cases, portions of content may be displayed in a progressive manner along a selected display path. Accordingly, context for the portions of content may be provided as the portions of content are displayed along the path. In some cases, placing focus on portions of content may be animated and the portions of content may perceptively zoom and glide into focus.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art.

Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1A:
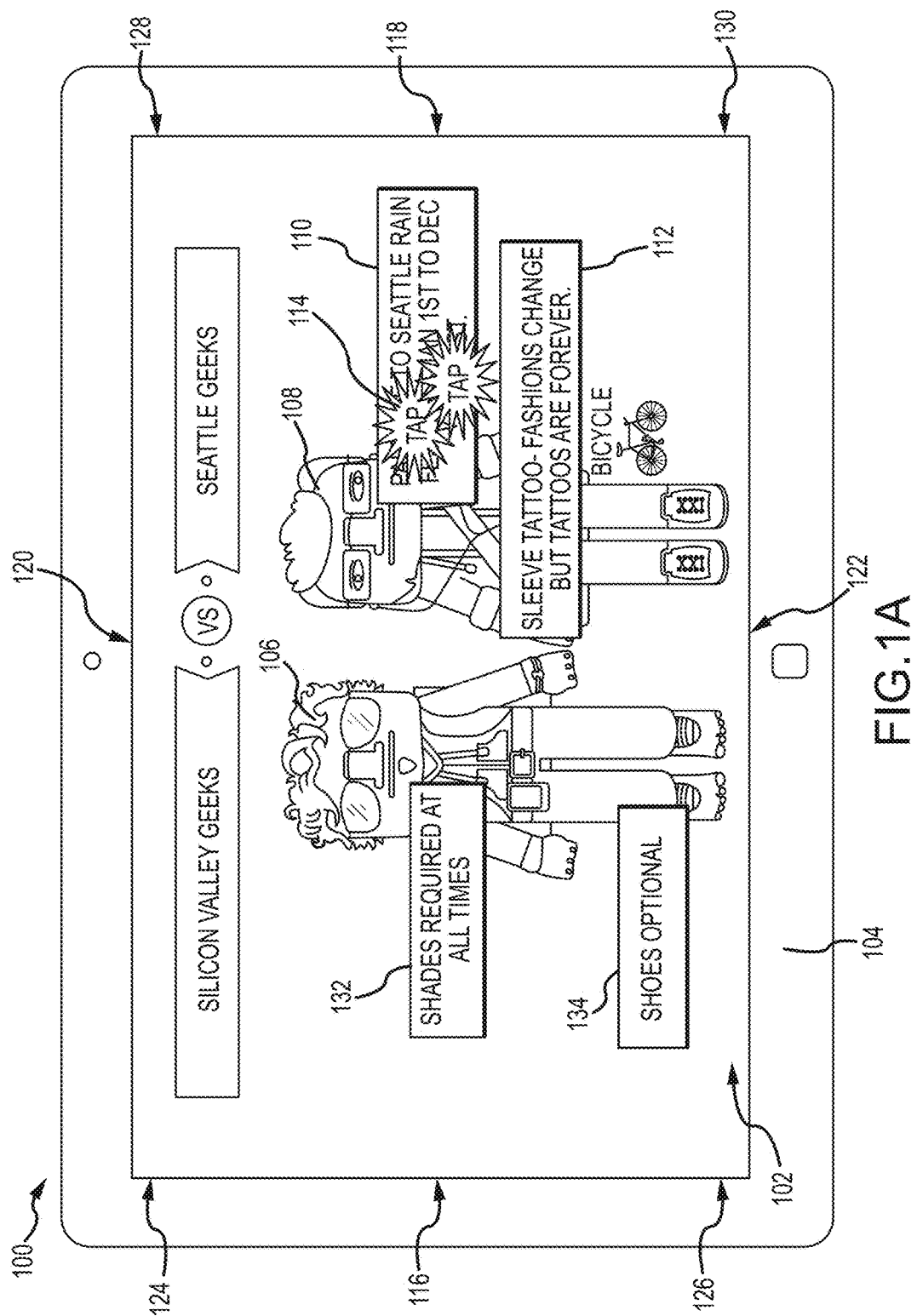
FIGS. 1A-1C illustrate embodiments of displaying content with contextual zoom focus using a touch screen.
Figure 1B:
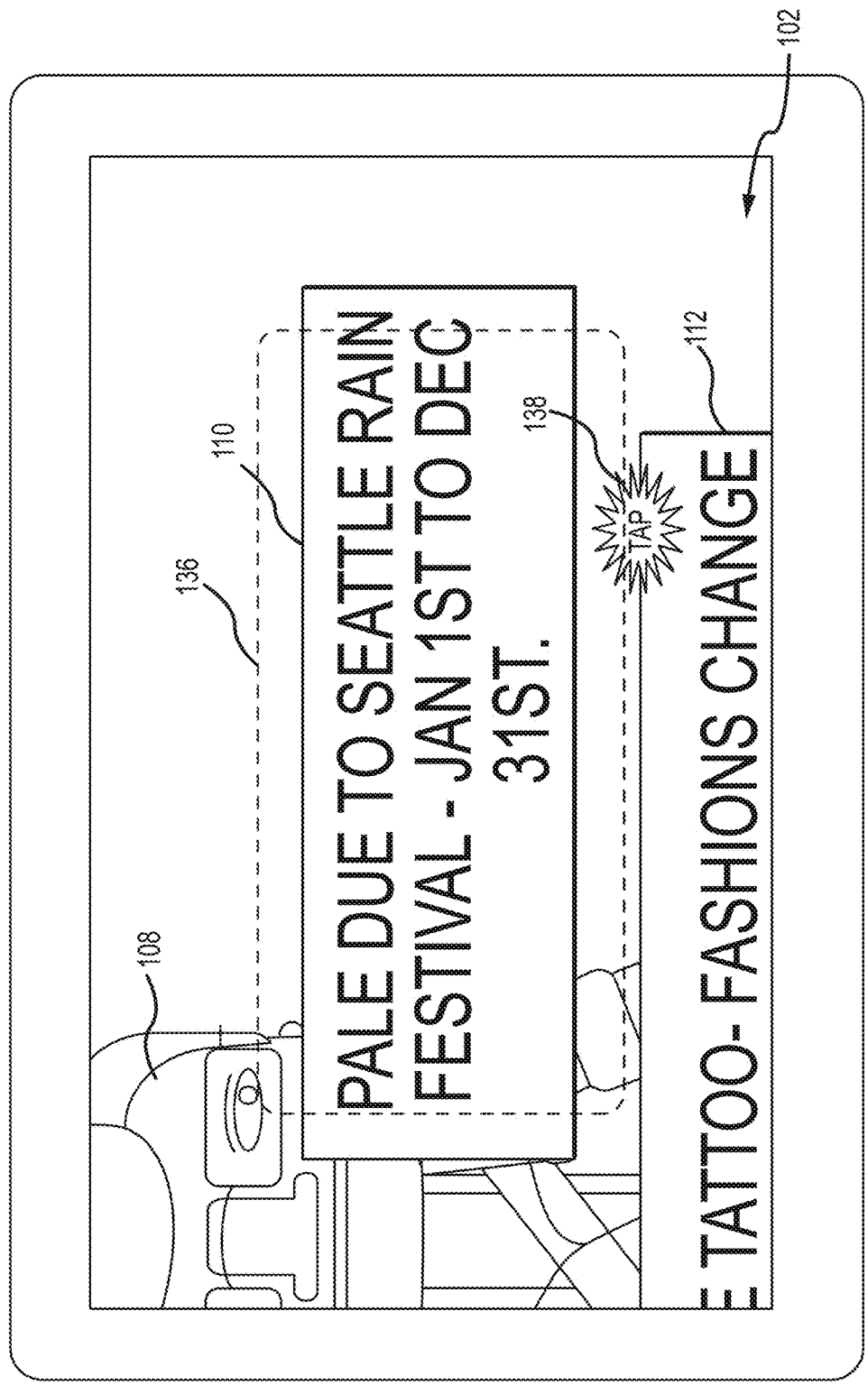
Figure 1C:
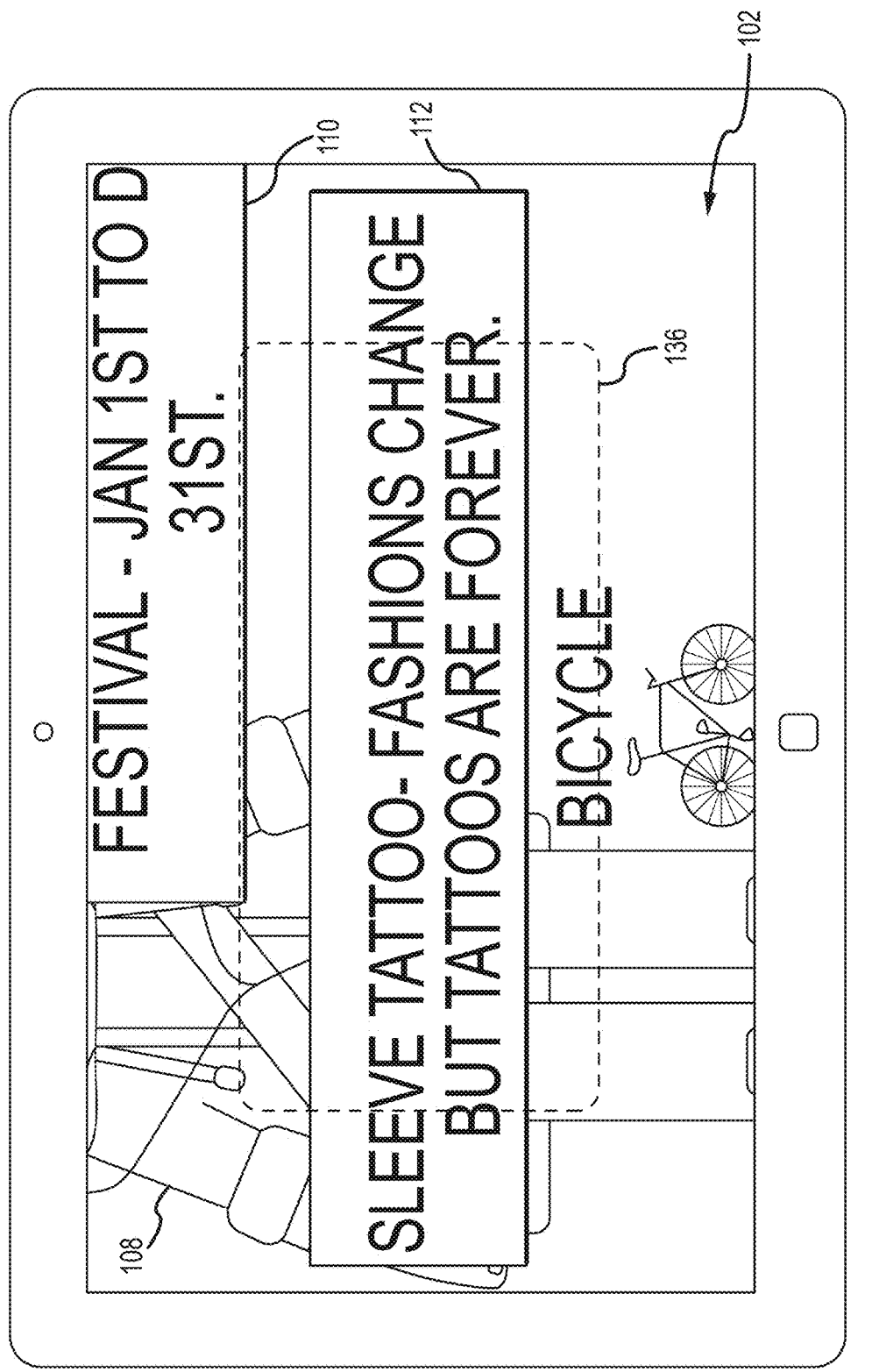

FIGS. 1A-1C illustrate embodiments of displaying content with contextual zoom focus using a touch screen.

FIG. 1A illustrates embodiments of displaying content on a computing device 100 equipped with a touch screen. As used herein, a touch screen includes a graphical user interface that is capable of receiving input via contact with the screen, thereby functioning as both an input device and an output device. For example, content may be displayed, or output, on the screen and input may be received by contacting the screen using a stylus or by direct physical contact of a user, e.g., touching the screen. Contact may include, for instance, tapping the screen, using gestures such as swiping or pinching the screen, sketching on the screen, etc. In embodiments, sketching on the screen may involve depicting visible shapes on the screen or invisible shapes on the screen, e.g., with a stylus or using touch. In embodiments, whether shapes are visible or invisible may depend on whether or not a computing device is configured to display the received shape to the user.

In further embodiments, content that is displayed or presented in real time, e.g., during a presentation, collaborative environment, or otherwise, is provided in a presentation mode. In contrast, during preparations for a subsequent presentation or display of content, content may be accessed and manipulated in an edit mode. Unless stated otherwise, embodiments described herein are illustrated in presentation mode.

As illustrated by FIG. 1A, the content is displayed within a window 102 surrounded by a housing 104 on computing device 100. In the illustrated embodiment, window 102 completely fills the touch screen of computing device 100. In other embodiments, window 102 may fill a portion of the touch screen, e.g., a predetermined or selected percentage of the touch screen (not shown).

In embodiments, window 102 includes a west edge 116, an east edge 118, a north edge 120 and a south edge 122. Additionally window 102 includes a northwest corner 124, a southwest corner 126, a northeast corner 128 and a southeast corner 130. As used herein, directional descriptions may be used in discussing portions of window 102. For example, an area of window 102 near east edge 118 may be described as an "eastern area" of window 102, and the like.

As illustrated, the displayed content includes a plurality of objects. In embodiments, an object may be any discrete item, e.g., a shape, a portion of text, an icon, an image, a link, etc. For example, objects 106 and 108 are animated human beings or avatars, and objects 110 and 112 are text boxes. Additionally, the plurality of objects is displayed in a configuration, or an arrangement, within window 102. That is, with respect to an object of the plurality of objects, some objects are displayed near the object and other objects are displayed farther away from the object in the arrangement. In embodiments, an object is near another object when the objects are not substantially separated by intervening white space and/or other objects within the arrangement. Alternatively, an object is farther from another object when the two objects are substantially separated by white space or other objects.

For example, object 106 is near object 108 in the arrangement of objects displayed in window 102, i.e., objects 106 and 108 are not substantially separated by white space or other objects. Object 106 is also near objects 132 and 134, which partially overlap object 106 and are not substantially separated from object 106 by white space or other objects. In contrast, object 106 is farther away from object 110, which is substantially separated from object 106 by white space and by object 108. One of skill in the art will appreciate that the configuration or arrangement of the plurality of objects within window 102 may be described in any number of suitable ways.

In embodiments, when viewing or presenting content in window 102, it may be desirable to emphasize less than all of the content, i.e., less than all of a plurality of objects within the content. For example, it may be desirable to emphasize a particular object or to guide a discussion from one object to another during a presentation. In other cases, it may be desirable to increase a size of an object for improved viewing or clarity of the object.

As used herein, the term "contextual zoom focus" refers to increasing a size of an object (zoom), repositioning the object in a central area of a window (focus), and at least partially displaying one or more additional objects and/or white space in the window to provide context for the object (context). Alternatively, the term "zoom focus" refers to increasing a size of an object (zoom) and repositioning the object in a central area of a window (focus). Further still, the term "dynamic zoom focus" refers to an ordered system for increasing the sizes of objects (zoom) and sequentially repositioning the objects (dynamic) in a central area of a window (focus). In embodiments, an object in contextual zoom focus, or dynamic zoom focus, may be referred to herein as a "smart-zoom-focused" object. Moreover, a view in which objects are displayed in contextual zoom focus or dynamic zoom focus may be referred to herein as a "smart-zoom-focus" view.

In embodiments, placing contextual-zoom-focus on an object may be triggered by receiving a selection of the object. In turn, selection of an object may be received by a double tap on or near the object using a stylus or touch. In other embodiments, selection of an object may be received by a double click on or near the object using a mouse, or selection may be received using short-cut keys on a keyboard, e.g., up, down, left, right arrow keys. In still other embodiments, selection of an object may be received by visibly or invisibly drawing a shape around the object, e.g., a circular shape.

In embodiments, when a selection is received, the displayed content is evaluated to identify an object nearest to the received input. For instance, the displayed content may be evaluated to determine the object nearest to a double tap or click. In embodiments, a double tap or click may be received directly on an object. In this case, according to embodiments, it may be determined that the object is selected for contextual-zoom-focus. In other embodiments, a double tap or click is received near one or more objects. In this case, a calculation may be conducted to determine the object closest to the received input, and the closest object may be selected for contextual-zoom-focus. In still other embodiments, a double tap or click may be received in white space that is not substantially near an object. In this case, no object may be selected. However, in this case, a view of the window may be adjusted, for example, from smart-zoom-focus view to normal view. Alternatively, in still other embodiments, when a visible or invisible shape is detected, the displayed content may be evaluated to determine an object nearest to a center of the shape, and the object nearest to the center may be selected for contextual-zoom-focus.

In the illustrated embodiment, object 110 is selected by double tap 114 received on object 110.

FIG. 1B illustrates embodiments of content displayed with contextual zoom focus in window 102.

In embodiments, when double tap 114 is received on or near object 110, contextual-zoom-focus is placed on object 110. For example, contextual-zoom-focus may include adjusting a view of window 102 from displaying the plurality of objects to primarily displaying object 110. That is, in some embodiments, contextual-zoom-focus may involve increasing a size of object 110 and repositioning object 110 to a central area 136 of window 102. In some cases, contextual-zoom-focus may be animated, i.e., object 110 may perceptively increase in size and glide from an eastern area of window 102, as illustrated in FIG. 1A, to a central area 136 of window 102, as illustrated by FIG. 1B. In other cases, contextual-zoom-focus may be immediate, i.e., the view of window 102 may quickly transition, or flash, from displaying object 110 in an eastern area of window 102 to displaying an enlarged form of object 110 in a central area 136 of window 102.

According to some embodiments, when contextual-zoom-focus is placed on an object of a plurality of objects, a size of the content, i.e., the plurality of objects, may also be increased (or zoomed). For example, as illustrated by FIG. 1B, in addition to increasing the size of object 110, sizes of objects 108 and 112 are increased within window 102.

In further embodiments, when contextual-zoom-focus is placed on an object, context for the contextual-zoom-focused object with respect to the plurality of objects may be preserved. For example, as described above, the plurality of objects may be arranged with respect to one another, as illustrated by a normal view in FIG. 1A. Moreover, in embodiments, the arrangement of the plurality of objects is fixed such that increasing the sizes of the plurality of objects in a smart-zoom-focus view does not alter the positions of the objects with respect to one another. Accordingly, in some embodiments, context for the contextual-zoom-focused object (e.g., object 110) with respect to the plurality of objects may be preserved by at least partially displaying one or more objects (e.g., objects 108 and 112) that are positioned near the contextual-zoom-focused object within the arrangement. In other embodiments, i.e., where there are no objects positioned near the contextual-zoom-focused object in the arrangement, context for the object (e.g., object 110) may be preserved by displaying at least some white space around the contextual-zoom-focused object. As used herein, a normal view refers to a display of content in a window without contextual-zoom-focus or dynamic zoom focus, i.e., with normal focus, and a smart-zoom-focus view refers to a display of content in a window with contextual-zoom-focus or dynamic-zoom-focus.

For example, to allow for context, contextual-zoom-focus may be placed on an object such that the object fills up to about 64% of a window. In other embodiments, contextual-zoom-focus may be placed on an object such that the object fills a majority of a window, e.g., more than about 50% but less than about 64% of the window. In still other embodiments, an object in contextual-zoom-focus may fill any suitable portion of a window such that the object is emphasized or highlighted within the window, but context with respect to the object is maintained. According to further embodiments, upon receiving a selection to place an object in contextual-zoom-focus, calculations may be made to determine an extent to which the size of the selected object should be increased in order for the selected object to fill about 64% of the window.

According to further embodiments, when a window is in smart-zoom-focus view, a selection may be received to adjust contextual-zoom-focus to a different object. For example, a selection to adjust contextual-zoom-focus to a different object may include a single tap or a single click on a partially displayed object within the window. Alternatively, a single tap or a single click may be received in one of eight directions surrounding the contextual-zoom-focused object (e.g., toward edges 116, 118, 120, 122, or toward corners 124, 126, 128 or 130 of window 102). In this case, contextual-zoom-focus is adjusted to an object near the direction of the single tap or single click. For example, as illustrated by FIG. 1B, single tap 138 may be received on object 112, which is partially displayed in the southwest corner of window 102.

According to alternative embodiments, when a window is in smart-zoom-focus view, a selection may be received to return to normal view (not shown). For example, a selection to return to normal view from smart-zoom-focus view may include a double tap or click in white space within window 102. For example, when returning to normal view, a size of the contextual-zoom-focused object (e.g., object 110) and sizes of other objects (e.g., objects 108 and 112) may decrease. Additionally, a position of the contextual-zoom-focused object may shift from the central area of the window to its original position in the arrangement of the plurality of objects. In embodiments, returning to normal view comprises returning to an original view of the plurality of objects in window 102, e.g., as illustrated by FIG. 1A.

In further embodiments, returning to normal view may be animated, immediate, or some combination thereof. For example, if the return to normal view is animated, the contextual-zoom-focused object, i.e., object 110, may perceptively decrease in sized and glide from the central area 136 of window 102, as illustrated in FIG. 1B, to an eastern area of window 102, as illustrated by FIG. 1A. In other cases, the return to normal view may be immediate, i.e., the view of window 102 may quickly transition, or flash, from displaying object 110 in a central area 136 of window 102 to displaying a diminished form (e.g., original size) of object 110 in an eastern area of window 102.

FIG. 1C illustrates embodiments of shifting contextual zoom focus for content displayed in window 102.

In embodiments, when single tap 138 is received on or near object 112, contextual-zoom-focus shifts from object 110 to object 112 in window 102. For example, shifting contextual-zoom-focus may include adjusting a view of window 102 from displaying object 110 in a central area 136 to displaying object 112 in the central area 136. Described more generally, according to embodiments, when contextual-zoom-focus is shifted from one object to another, the view may adjust from a contextual-zoom-focus on a first object (e.g., the contextual-zoom-focused object) to a second object (e.g., the selected object).

In some cases, shifting contextual-zoom-focus may be animated, i.e., object 112 may perceptively glide from a southwestern area of window 102, as illustrated in FIG. 1B, to a central area 136 of window 102, as illustrated by FIG. 1C. In other cases, shifting contextual-zoom-focus may be immediate, i.e., the view of window 102 may quickly transition, or flash, from displaying object 110 in a central area 136 of window 102 to displaying object 112 in the central area 136 of window 102.

As described above, in contextual-zoom-focus view, both a size of the contextual-zoom-focused object, as well as the sizes of other objects of the plurality of objects, may already be increased (or zoomed). Accordingly, adjusting contextual-zoom-focus from a first object to a second object in smart-zoom-focus view may not involve further increasing a size of the second object. Alternatively, if sizes of the plurality of objects were not increased during a transition from normal view to smart-zoom-focus view, a size of the second object may be increased as contextual-zoom-focus shifts from the first object to the second object. Alternatively still, a size of the second object may be increased or decreased based on calculations such that the second object occupies about 64% of the window.

In further embodiments, when contextual-zoom-focus is shifted from a first object to a second object, context for the second object with respect to the plurality of objects may be preserved in the smart-zoom-focus view. As described above, the arrangement of the plurality of objects is fixed such that positions of the objects with respect to one another are not altered between the normal view and the smart-zoom-focus view. Accordingly, context for the second object with respect to the plurality of objects may be preserved by at least partially displaying one or more objects that are positioned near the second object within the arrangement. Alternatively, context may be preserved for the second object by displaying at least some white space around the contextual-zoom-focused object.

With reference to FIG. 1A, objects 106, 108 and 110 are positioned near object 112 in the arrangement of the plurality of objects. That is, objects 106, 108 and 110 are not substantially separated from object 112 by intervening white space or other objects within the arrangement.

As illustrated by FIG. 1C, context is maintained for object 112 by at least partially displaying nearby objects 108 and 110 in window 102. For example, object 108 is partially displayed to the north and the south of object 112 and object 110 is partially displayed along a northeastern edge of window 102.

As should be appreciated, embodiments illustrated and described with reference to FIGS. 1A-1C are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

Figure 2A:
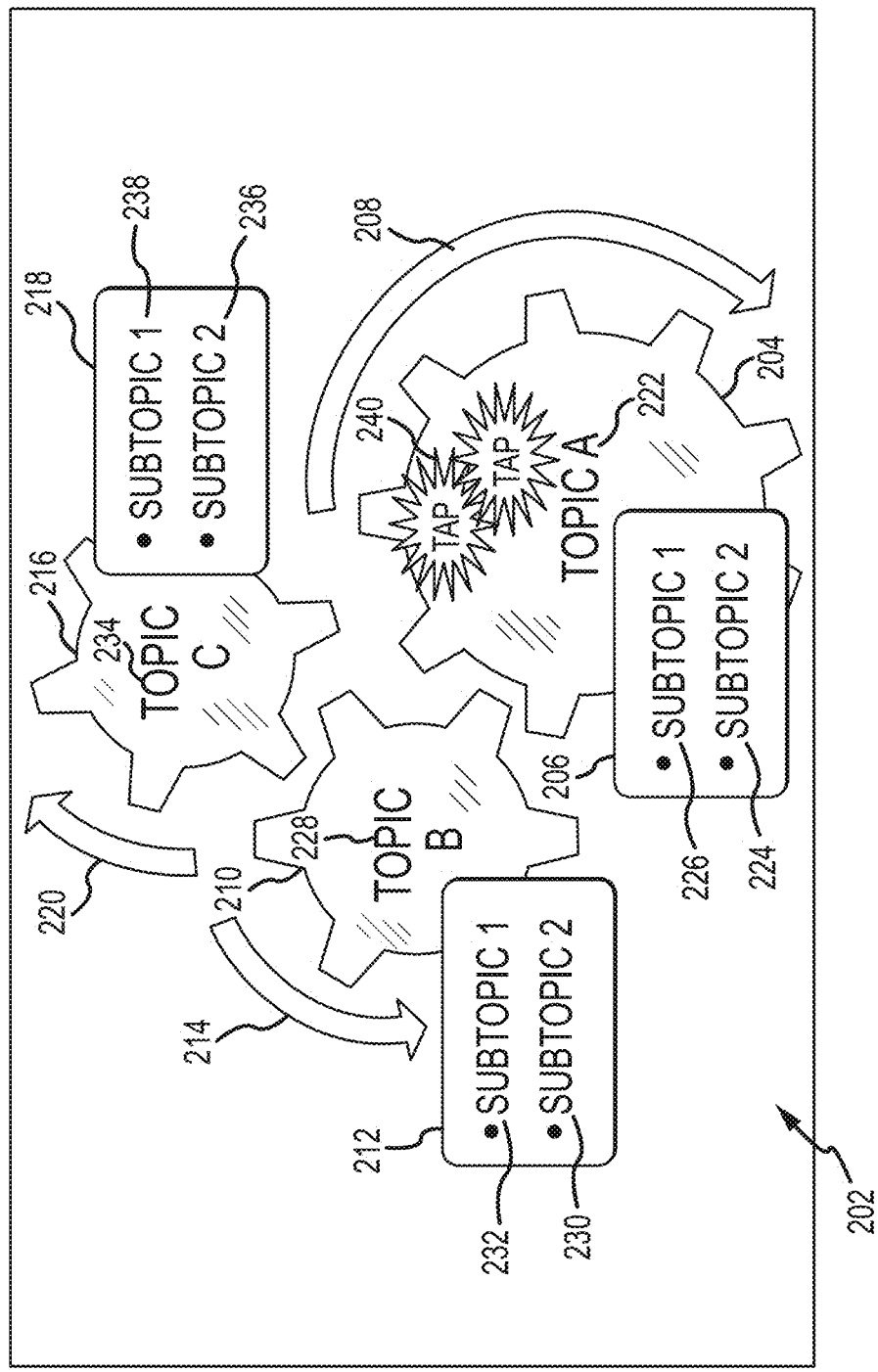
Figure 2C:
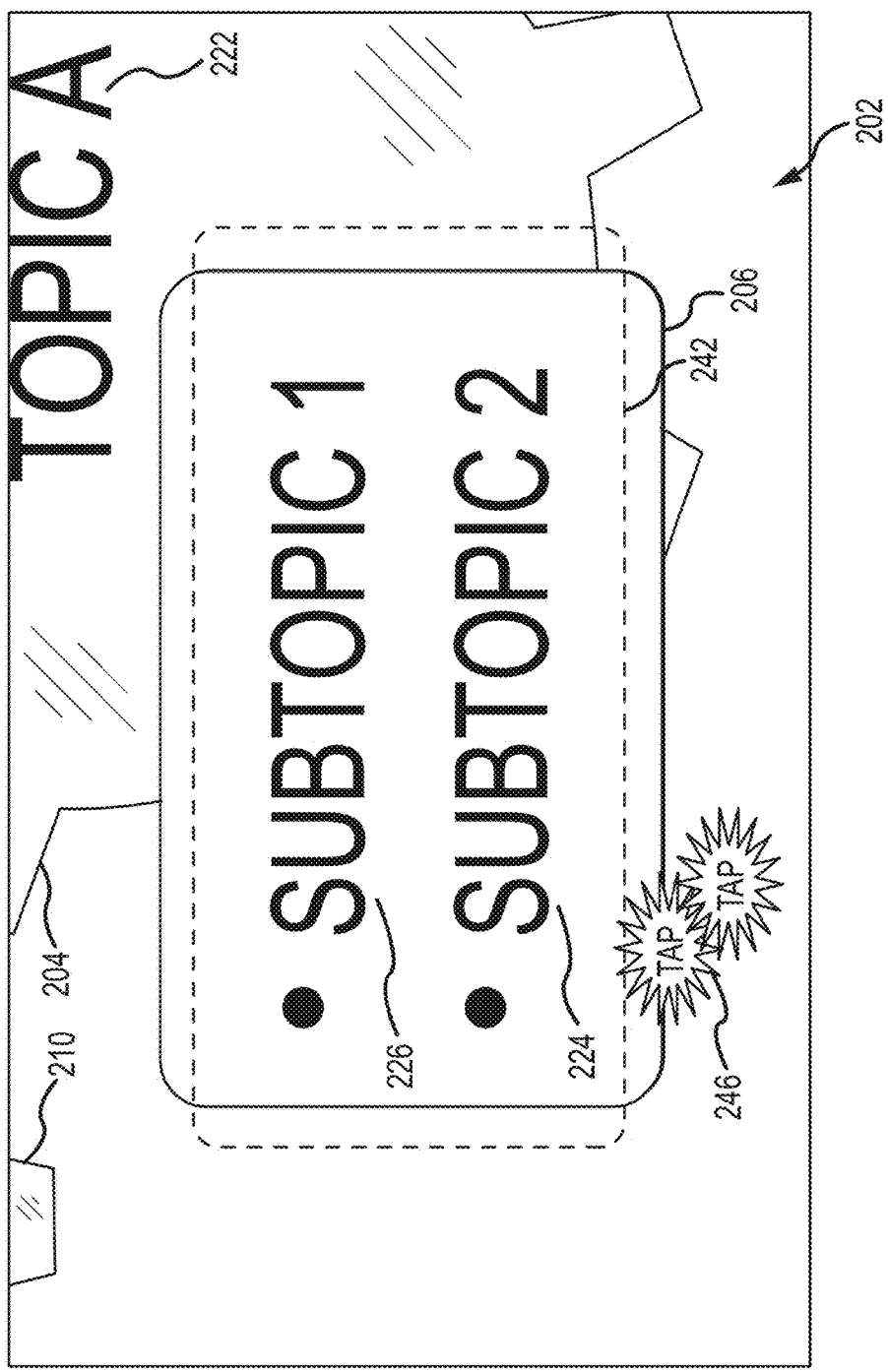

FIGS. 2A-2C illustrate embodiments of displaying content with contextual zoom focus in a slide presentation.

FIG. 2A illustrates embodiments of displaying content during a presentation. In embodiments, content may be displayed during a presentation in any suitable manner. For instance, content may be displayed in a collaborative or shared environment, in a live setting, via web based applications, etc. In some embodiments, a presentation may comprise displaying content in discrete parts, or slides. In embodiments, each slide of a presentation may comprise one or more objects. For example, an object may be any discrete item, e.g., a shape, a portion of text, an icon, an image, a hyperlink, a media file, etc.

Additionally, in some embodiments, an object may be associated with one or more elements. As with objects, elements may be any discrete item. However, elements are associated with, related to, identified with, linked to, or in some way connected to an object. For example, an object such as a shape may be associated with an element that describes the shape, such as a title or other text.

In further embodiments, an element may be associated with one or more sub-elements. As with objects and elements, sub-elements may be any discrete item. However, sub-elements are associated with, related to, identified with, linked to, or in some way connected to an element. For example, an element that is a shape may be associated with a sub-element, such a hyperlink, which relates to the element. In some embodiments, objects, elements and sub-elements may be in a hierarchical relationship, but this is not necessary.

FIG. 2A illustrates a slide 202 of a presentation. For purposes of this disclosure, slide 202 may be referred to interchangeably as window 202. As illustrated, slide 202 displays object 204, object 210 and object 216. For example, objects 204, 210 and 216 are gear shapes.

Additionally, as illustrated, object 204 comprises three elements, i.e., elements 206, 208 and 222. Specifically, element 222 is a textual item that describes object 204 as "Topic A"; element 206 is a rectangular shape associated with object 204; and element 208 is an arrow shape identifying information about object 204, e.g., a direction of rotation for the gear shape. In some embodiments, element 206 is associated with at least two sub-elements 224 and 226. Sub-elements 224 and 226 are textual items associated with element 206 and object 204 that specify "Subtopic 1" and "Subtopic 2" (in some cases, bullet points may be considered part of sub-elements 224 and 226, in other cases bullet points may be considered sub-sub-elements associated with sub-elements 224 and 226). In alternative embodiments, sub-elements 224 and 226 may be associated or linked to element 222, i.e., "Topic A," rather than element 206.

Similar to object 204, object 210 is associated with three elements, i.e., elements 212, 214 and 228. In this case, element 228 is a textual item that describes object 210 as "Topic B"; element 212 is a rectangular shape associated with object 210; and element 214 is an arrow shape identifying information about object 210, e.g., a direction of rotation for the gear shape. In some embodiments, element 212 is associated with at least two sub-elements 230 and 232. Sub-elements 230 and 232 are textual items associated with element 212 and object 210 that specify "Subtopic 1" and "Subtopic 2" (in some cases, bullet points may be considered part of sub-elements 230 and 232, in other cases bullet points may be considered sub-sub-elements associated with sub-elements 230 and 232). In alternative embodiments, sub-elements 230 and 232 may be associated or linked to element 228, i.e., "Topic B," rather than element 212.

Further still, object 216 is associated with three elements, i.e., elements 218, 220 and 234. In this case, element 234 is a textual item that describes object 216 as "Topic C"; element 218 is a rectangular shape associated with object 216; and element 220 is an arrow shape identifying information about object 216, e.g., a direction of rotation for the gear shape. In some embodiments, element 218 is associated with at least two sub-elements 236 and 238. Sub-elements 236 and 238 are textual items associated with element 218 and object 216 that specify "Subtopic 1" and "Subtopic 2" (in some cases, bullet points may be considered part of sub-elements 236 and 238, in other cases bullet points may be considered sub-sub-elements associated with sub-elements 236 and 238). In alternative embodiments, sub-elements 236 and 238 may be associated or linked to element 234, i.e., "Topic B," rather than element 218.

According to additional embodiments, the objects, elements, and sub-elements may be displayed in a configuration, or an arrangement, within slide 202. That is, with respect to a particular item (e.g., object, element, or sub-element), some items (e.g., other objects, elements, or sub-elements), are displayed near the item and other items are displayed farther away from the item in the arrangement.

For example, object 204 is located near elements 206, 208 and objects 210, 216 in the arrangement of items displayed on slide 202. That is, elements 206 and 208 and objects 210 and 216 are not substantially separated from object 204 by intervening white space or other items. Object 204 is also near element 222, which is located within object 204 and, accordingly, is not substantially separated from object 204 by white space and/or other items. In contrast, object 204 is farther away from elements 214, 218, and 220 and sub-elements 236 and 238, which are substantially separated from object 204 by white space and/or by other items. One of skill in the art will appreciate that the configuration or arrangement of the plurality of items within slide 202 may be described in a number of suitable ways.

In embodiments, when presenting content on slide 202, it may be desirable to emphasize less than all of a plurality of items displayed on the slide 202. For example, it may be desirable to emphasize a particular item or to guide a discussion from one item to another during the presentation. In other cases, it may be desirable to increase a size of an item for improved viewing or clarity of the item.

In embodiments, placing contextual-zoom-focus on an item (e.g., an object, element or sub-element) may be triggered by receiving a selection of the item. In turn, selection of an item may be received by a double tap on or near the item using a stylus or touch. In other embodiments, selection of an item may be received by a double click on or near the item using a mouse or short-cut keys on a keyboard. In still other embodiments, selection of an item may be received by visibly or invisibly drawing a shape around the item. In the illustrated embodiment, object 204 is selected by double tap 240.

FIG. 2B illustrates embodiments of content displayed with contextual zoom focus during a presentation.

In embodiments, when double tap 240 is received on or near object 204, contextual-zoom-focus is placed on object 204. For example, contextual-zoom-focus may include adjusting a view of slide 202 from displaying the plurality of items to primarily displaying object 204. That is, in some embodiments, contextual-zoom-focus may involve increasing a size of object 204 and repositioning object 204 to a central area 242 of slide 202. In some cases, contextual-zoom-focus may be animated, i.e., object 204 may perceptively increase in size and glide from a southeastern area of slide 202, as illustrated in FIG. 2A, to a central area 242 of slide 202, as illustrated by FIG. 2B. In other cases, contextual-zoom-focus may be immediate, i.e., the view of slide 202 may quickly transition, or flash, from displaying object 204 in a southeastern area of slide 202 to displaying an enlarged form of object 204 in a central area 242 of slide 202.

In further embodiments, when contextual-zoom-focus is placed on an item, context for the contextual-zoom-focused item with respect to the plurality of items may be preserved. For example, as described above, the plurality of items may be arranged with respect to one another, as illustrated by FIG. 2A. Moreover, in embodiments, the arrangement of the plurality of items is fixed such that increasing the sizes of the plurality of items does not alter the positions of the items with respect to one another. Accordingly, context for the contextual-zoom-focused item (e.g., object 204) with respect to the plurality of items may be preserved by at least partially displaying one or more items (e.g., objects 210 and 216, elements 206, 208, 212 and 222, and sub-elements 224 and 226) that are positioned near the contextual-zoom-focused item within the arrangement.

According to further embodiments, when a slide is in a smart-zoom-focus view, a selection of an element may be received to further apply contextual-zoom-focus to the view, or ultra-focus the view. As described above, selection of an element may be received by a double tap on or near the element using a stylus or touch. In other embodiments, selection of an element may be received by a double click on or near the element using a mouse or short-cut keys on a keyboard. In still other embodiments, selection of an element may be received by visibly or invisibly drawing a shape around the element, e.g., a circular shape. In the illustrated embodiment, element 206 is selected by double tap 244.

FIG. 2C illustrates embodiments of content displayed with additional contextual zoom focus during a presentation.

In embodiments, when double tap 244 is received on or near element 206, ultra-focus is placed on element 206. Similar to contextual-zoom-focus, as described above, ultra-focus may include adjusting a view of slide 202 from primarily displaying object 204 to primarily displaying element 206. Additionally, in some embodiments, ultra-focus may involve further increasing a size of element 206 and repositioning element 206 to a central area 242 of slide 202. Similar to contextual-zoom-focus, ultra-focus may be animated, i.e., element 206 may perceptively increase in size and glide from a southwestern area of slide 202, as illustrated in FIG. 2B, to a central area 242 of slide 202, as illustrated by FIG. 2C. In other cases, ultra-focus may be immediate, i.e., the view of slide 202 may quickly transition, or flash, from displaying element 206 in a southwestern area of slide 202 to displaying an enlarged form of element 206 in a central area 242 of slide 202.

In further embodiments, similar to contextual-zoom-focus, when ultra-focus is placed on an item, context for the ultra-focused item with respect to the plurality of items may be preserved. As illustrated, context for element 206 with respect to the plurality of items may be preserved by at least partially displaying one or more items (e.g., objects 204 and 210, element 222, and sub-elements 224 and 226) that are positioned near element 206 within the arrangement.

According to additional embodiments, when a slide is in ultra-focus view, a selection may be received to return to smart-zoom-focus view. For example, to return to smart-zoom-focus view, a double tap or a double click may be received in white space of slide 202. In embodiments, when returning to smart-zoom-focus view, a size of the ultra-focused item (e.g., element 206) and sizes of other items (e.g., objects 204 and 210, element 222, and sub-elements 224 and 226) may decrease. Additionally, a position of the ultra-focused object may shift from the central area 242 of slide 202 to its position in smart-zoom-focus view, e.g., a southwestern corner of slide 202, as illustrated by FIG. 2B. To return to normal view, as described above, an additional double tap or double click may be received in white space of slide 202.

In the illustrated embodiment, a double tap 246 is received in white space southwest of element 206.

As should be appreciated, embodiments illustrated and described with reference to FIGS. 2A-2C are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

FIGS. 3A-3D illustrate embodiments of displaying content by adjusting a zoom level.

Figure 3A:
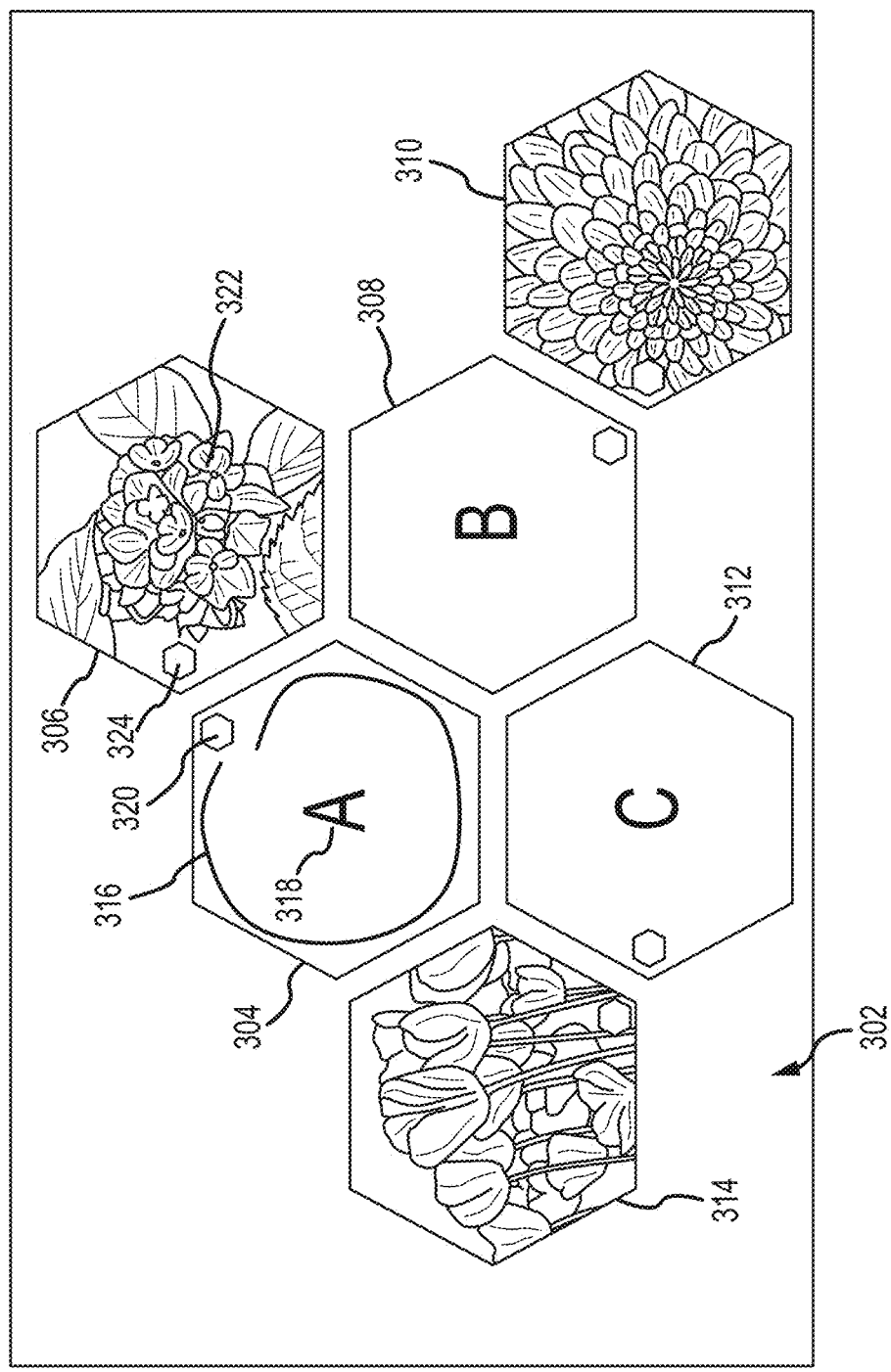

FIG. 3A illustrates embodiments of content displayed in a window 302. In some embodiments, window 302 may be equipped with a touch screen. As illustrated, the displayed content includes a plurality of objects. For example, objects 304-314 are hexagonal shapes. Objects 304-314 further include one or more elements. For example, object 304 includes element 318, which is a textual letter "A," and element 320, which is a hexagonal shape. Objects 308 and 312 are illustrated with similar elements. Additionally, object 306 includes element 322, which is an image, and element 324, which is a hexagonal shape. Objects 310 and 314 are illustrated with similar elements.

Additionally, the plurality of objects is displayed in a configuration, or an arrangement, within window 302. For example, object 304 is near objects 306, 308, 312 and 314 in the arrangement of objects displayed in window 302, i.e., object 304 is not substantially separated from objects 306, 308, 312 and 314 by white space or other objects. In contrast, object 304 is farther away from object 310, which is substantially separated from object 304 by white space and by object 308. One of skill in the art will appreciate that the configuration or arrangement of the plurality of objects within window 302 may be described in a number of suitable ways.

In embodiments, when viewing or presenting content in window 302, it may be desirable to emphasize less than all of a plurality of objects. In embodiments, placing contextual-zoom-focus on an object may be triggered by receiving a selection of the object. As described above, selection of an object may be received by a double tap or a double click on or near the object. Alternatively, selection of an object may be received by visibly or invisibly drawing a shape on the object, e.g., a circular shape. In embodiments, a line identifying the shape may or may not be completely continuous around the shape. For example, a circle or triangle may not be completely closed. Moreover, in embodiments, the shape may not be precisely circular or rectangular, etc. That is, the system may recognize a shape around or on an object whether or not the shape is precisely or accurately drawn. As used herein, a shape "substantially enclosing" an object shall refer to a line or lines that create or approximate a closed shape drawn substantially on or around the object. In addition, as used herein, a shape that is drawn "around" an object shall also refer to a shape drawn "on" an object (e.g., where one or more edges of the object protrude beyond the line(s) of the shape). In the illustrated embodiment, object 304 is selected by drawing a visible circle within object 304 using a stylus or touch, i.e., circle 316.

Figure 3B:
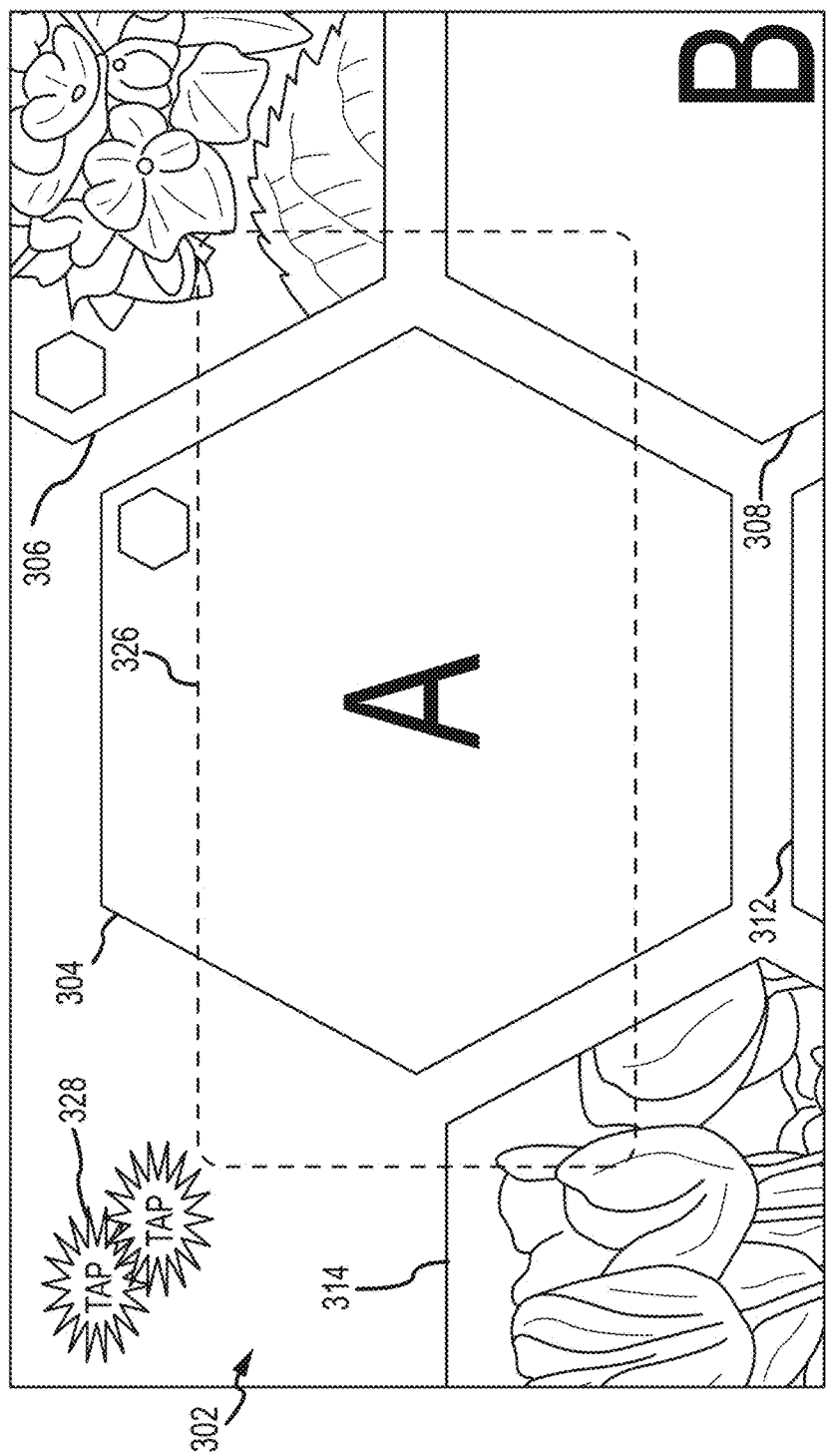

FIG. 3B illustrates embodiments of content displayed with contextual zoom focus in window 302.

In embodiments, when circle 316 is received within object 304, contextual-zoom-focus is placed on object 304. As described above, contextual-zoom-focus may involve increasing a size of object 304 and repositioning object 304 to a central area 326 of window 302. In embodiments, an extent to which the size of object 304 is increased may be based at least in part on a size of circle 316. For example, the smaller the size of circle 316, the greater the increase in size (or zoom) of object 304. Conversely, the larger the size of circle 316, the smaller the increase in size (or zoom) of object 304. As described above, contextual-zoom-focus may be animated, immediate, or some combination thereof.

In further embodiments, when contextual-zoom-focus is placed on an object, context for the contextual-zoom-focused object with respect to the plurality of objects may be preserved. For example, context for the contextual-zoom-focused object (e.g., object 304) with respect to the plurality of objects may be preserved by at least partially displaying one or more objects (e.g., objects 306, 308, 312 and 314) that are positioned near the contextual-zoom-focused object within the arrangement.

As described above, when a window is in smart-zoom-focus view, a selection may be received to return to normal view. For example, a double tap or a double click may be received in white space of window 302. In embodiments, when returning to normal view, a size of the contextual-zoom-focused object (e.g., object 304) and sizes of other objects (e.g., objects 306, 308, 312 and 314) may decrease. Additionally, a position of the contextual-zoom-focused object may shift from the central area 326 of window 302 to its original position in normal view, e.g., a northwestern area of window 302, as illustrated by FIG. 3A. As described above, in embodiments, returning to normal view may be animated, immediate, or some combination thereof. As illustrated, double tap 328 is received in white space of window 302 to return to normal view.

Figure 3C:
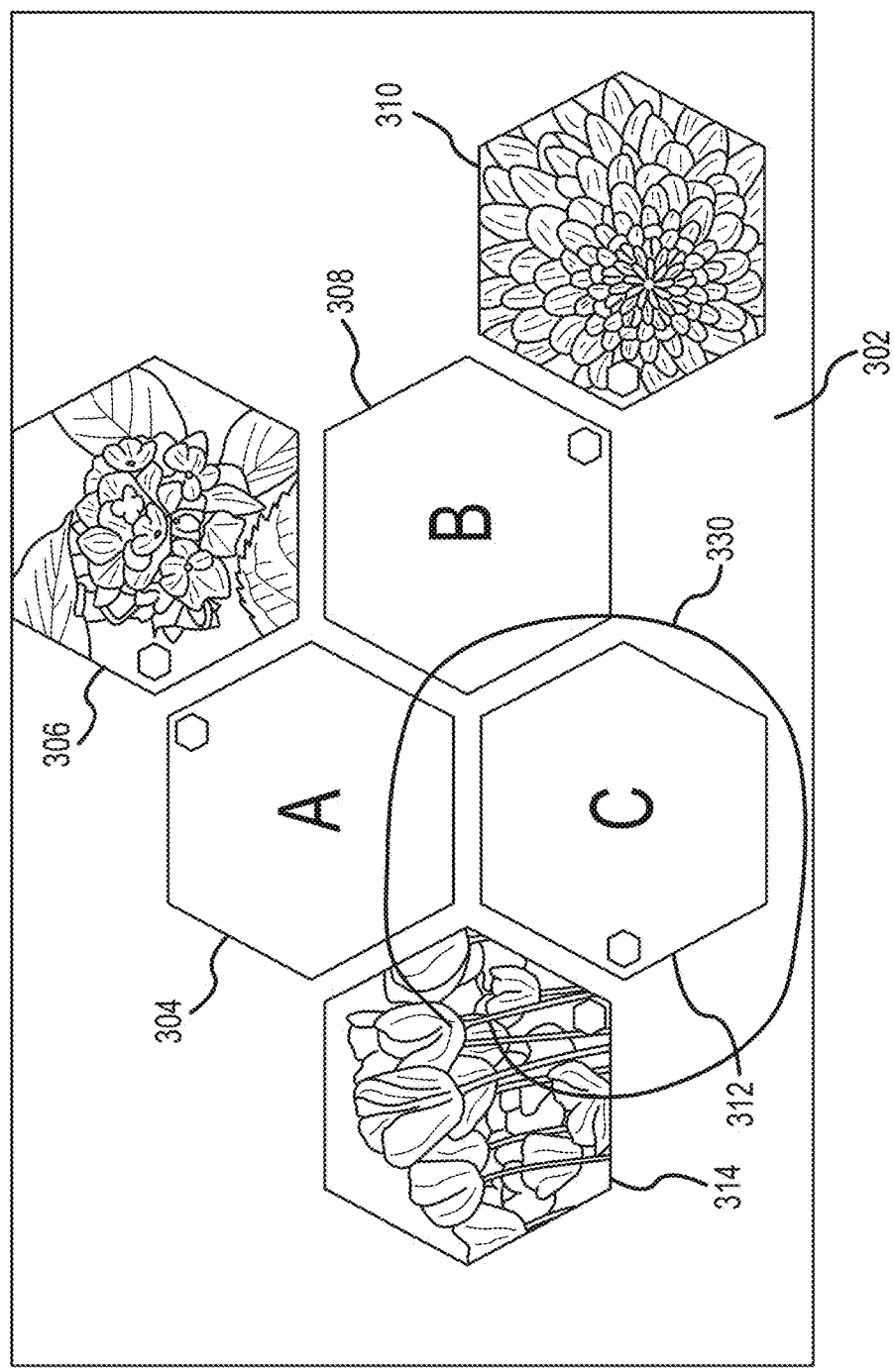

FIG. 3C illustrates embodiments for adjusting a zoom level.

In embodiments, when double tap 328 is received in white space of window 302, the view of window 302 returns to normal view from smart-zoom-focus view. Accordingly, the view of window 302 in FIG. 3C is substantially the same as the view of window 302 in FIG. 3A. As described above, selection of an object for contextual-zoom-focus may be received by visibly or invisibly drawing a shape on the object, e.g., a circular shape.

In the illustrated embodiment, object 312 is selected by drawing a visible circle around object 312 using a stylus or touch, i.e., circle 330. According to embodiments, circle 330, which is drawn around object 312, is larger than circle 316, which is drawn within 304.

FIG. 3D illustrates embodiments of content displayed with an adjusted zoom in window 302.

In embodiments, when circle 330 is received around object 312, contextual-zoom-focus is placed on object 312. As described above, contextual-zoom-focus may involve increasing a size of object 312 and repositioning object 312 to a central area 326 of window 302. As described above, the extent to which the size of object 312 is increased may be based at least in part on the size of circle 330. For example, the smaller the size of circle 330, the greater the increase in size (or zoom) of object 312. Conversely, the larger the size of circle 330, the smaller the increase in size (or zoom) of object 312. As described above, contextual-zoom-focus may be animated, immediate, or some combination thereof.

As provided above, circle 330 is larger than circle 316. Accordingly, the increased size of object 304, as illustrated in smart-zoom-focus view by FIG. 3B, is larger than the increased size of object 312, as illustrated in smart-zoom-focus view by FIG. 3D.

As should be appreciated, embodiments illustrated and described with reference to FIGS. 3A-3D are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

FIGS. 4A-4D illustrate embodiments of displaying content with contextual zoom focus in a document.

Figure 4A:
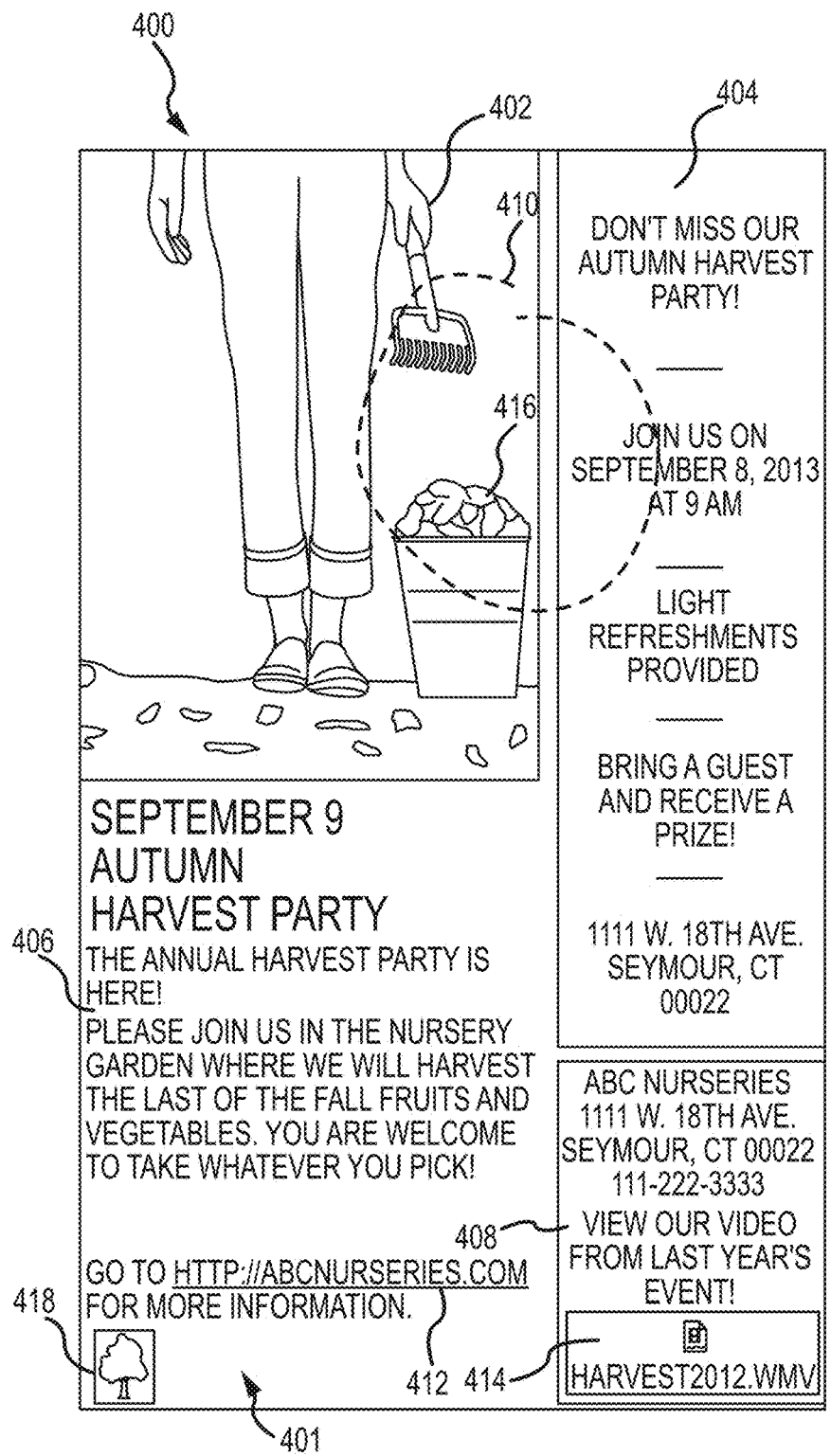

FIG. 4A illustrates an embodiment of displaying content in a document 400. Similar to embodiments described above, aspects of contextual zoom focus may also be provided for viewing or presenting a document. In embodiments, content may be viewed or presented in a document in any suitable manner. For instance, the document may be viewed in a window 401 of a computing device in a collaborative or shared environment or in a local environment. In some embodiments, the computing device may be equipped with a touch screen. As illustrated, document 400 fills window 401 in a portrait orientation. In embodiments, the document may comprise one or more items (objects, elements, sub-elements, etc.) such as shapes, text, icons, images, hyperlinks, media files, etc. Document 400 is a single-page brochure; however, any type of document would be suitable for purposes of the present disclosure, e.g., a word processing document, a spreadsheet, a document in portable document format (PDF), etc.

As illustrated, document 400 comprises various items, as defined above, such as objects 402, 404, 406, 408, 412, 416 and 418. In embodiments, objects 402, 416 and 418 are images; objects 404 and 408 are shapes; object 406 is textual; and object 412 is a hyperlink. Further, as illustrated, at least some of the objects comprise one or more elements. For example, object 404 includes text elements, and object 408 includes both text elements and a media file 414.

In embodiments, the objects and elements may be displayed in a configuration, or an arrangement, within document 400. That is, with respect to a particular item (e.g., object or element), some items (e.g., other objects and elements) are displayed near the item and other items are displayed farther away from the item in the arrangement.

For example, object 416 is located near objects 402 and 404 in the arrangement of items displayed in document 400. That is, object 416 is not substantially separated from objects 402 and 404 by intervening white space or other items. In contrast, object 416 is farther away from objects 406, 408, 412 and 418, which are substantially separated from object 416 by white space and/or other items.

In embodiments, when presenting document 400, it may be desirable to emphasize less than all of the plurality of items. In the illustrated embodiment, an object is selected for contextual-zoom-focus by drawing an invisible circle 410, e.g., by stylus or touch (identified by a dashed line), on a portion of the document. In embodiments, an object closest to the center of an invisible circle is selected for contextual-zoom-focus. In this case, while circle 410 overlaps objects 402, 404 and 416, object 416 is closest to the center of circle 410 and is selected for contextual-zoom-focus.

Figure 4B:
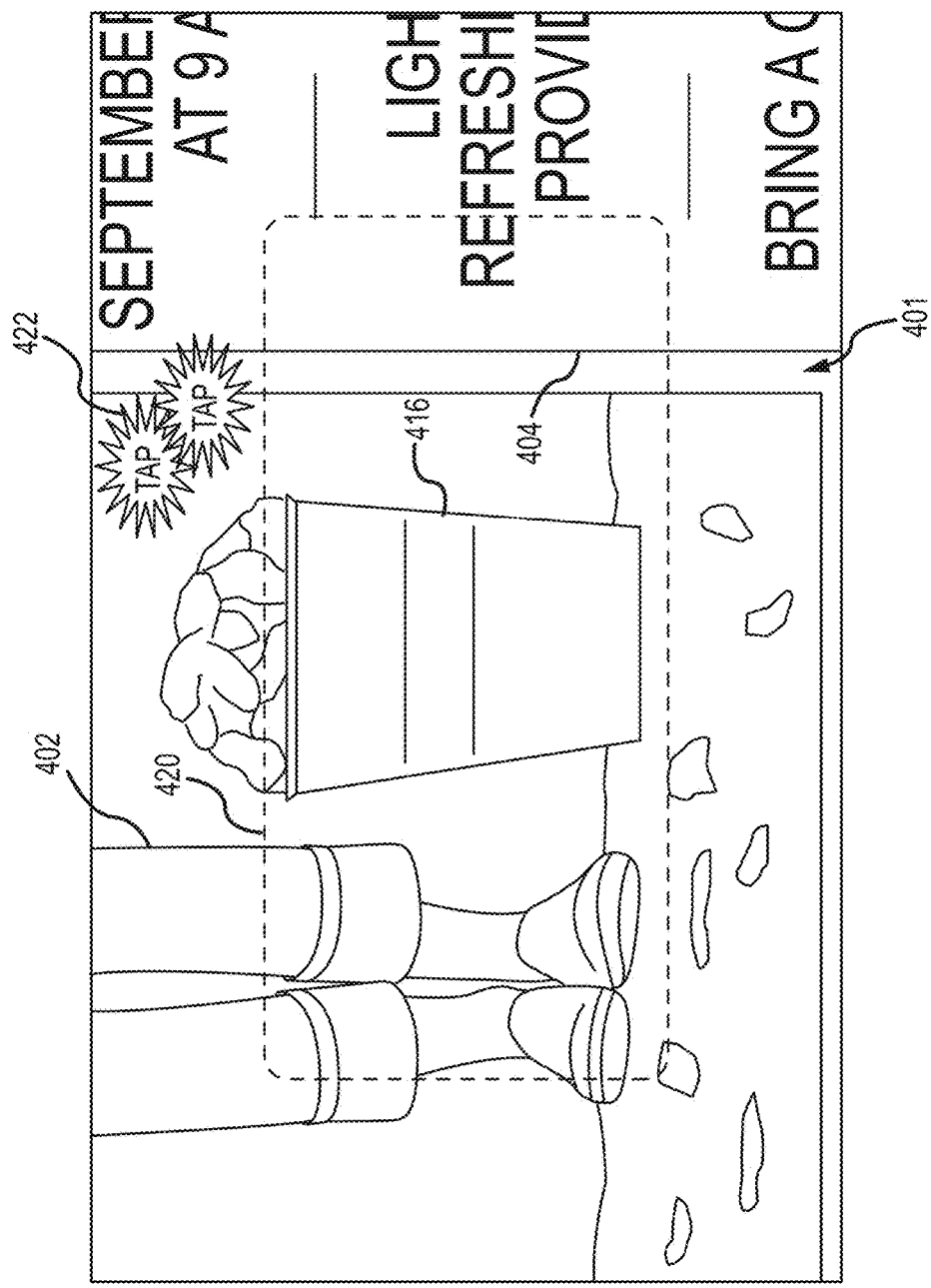

FIG. 4B illustrates embodiments of content displayed with contextual zoom focus in a document.

In embodiments, when invisible circle 410 is received on or near object 416, contextual-zoom-focus is placed on object 416. For example, contextual-zoom-focus may include adjusting a view of window 401 from displaying the plurality of items to primarily displaying object 416. In some embodiments, to best accommodate a contextual-zoom-focused object, an orientation of window 401 may be adjusted, e.g., between portrait and landscape orientation. In the illustrated embodiment, the orientation of window 401 is adjusted to landscape orientation. In further embodiments, contextual-zoom-focus may involve increasing a size of object 416 and repositioning object 416 to a central area 420 of window 401.

Additionally, in embodiments, when contextual-zoom-focus is placed on an item, context for the contextual-zoom-focused item with respect to the plurality of items in document 400 may be preserved. For example, as described above, the plurality of items may be arranged with respect to one another, as illustrated by FIG. 4A. In some embodiments, context for the contextual-zoom-focused item (e.g., object 416) with respect to the plurality of items may be preserved by at least partially displaying one or more items (e.g., objects 402 and 404) that are positioned near the contextual-zoom-focused item.

According to further embodiments, when a slide is in a smart-zoom-focus view, a selection may be received to return to normal view. As described above, a selection to return to normal view may be received by a double tap or a double click in white space. In the illustrated embodiment, double tap 422 is received in white space of window 401. Upon returning to normal view, the document is displayed in window 401 as illustrated by FIG. 4A.

FIG. 4C illustrates embodiments of content displayed with contextual zoom focus in a document.

Upon returning to normal view, additional selections may be received for viewing or presenting document 400. For example, object 412 may be selected. Object 412 is a hyperlink to a website, i.e., http://abcnurseries.com. In embodiments, a single tap or click on object 412 in normal view opens a browser for viewing the website. In some embodiments, a window for the browser may be opened in addition to window 401, and both windows may be displayed within an available area of the touch screen or other display device (not shown). For example, in some embodiments, each window may occupy about 50% of the available display area; alternatively, each window may occupy any other suitable portion or percentage of the display area. In embodiments, selection of a hyperlink by a single click or tap operates in a similar fashion when the hyperlink is provided in a presentation slide or other displayed content, as described with reference to FIGS. 1A-3D.

Alternatively, object 412 may be selected for contextual-zoom-focus. As described above, object 412 may be selected for contextual-zoom-focus by a double tap or click, or by a visible or invisible circle, on or near object 412. Upon selecting object 412 for contextual-zoom-focus, a size of object 412 may be increased and object 412 may be repositioned to a central area 420 of window 401. Moreover, an orientation of window 401 may be adjusted, e.g., from portrait to landscape orientation. As illustrated, an enlarged form of the hyperlink for the above website may be displayed in a central area 420 of window 401 in landscape orientation. Moreover, a context for object 412 may be preserved in smart-zoom-focus view, i.e., other objects positioned near object 412 (e.g., portions of object 406 and object 418) may be at least partially displayed in window 401. As described above, applying contextual-zoom-focus on object 412 may be animated, immediate, or some combination thereof.

When in smart-zoom-focus view, for example, a single tap or click on object 412 may open a browser for viewing the website. In some embodiments, a window for the browser may be opened in addition to window 401, and both windows may be displayed within an available area of the touch screen or other display device (not shown). For example, in some embodiments, each window may occupy about 50% of the available display area; alternatively, each window may occupy any other suitable portion or percentage of the display area. In further embodiments, when a browser window is opened in addition to window 401, the view in window 401 may automatically return to normal view from smart-zoom-focus view (not shown).

In further embodiments, a selection may be received to return to normal view from smart-zoom-focus view. As described above, a selection to return to normal view may be received by a double tap or a double click in white space. Alternatively, in the case of a hyperlink, a selection to return to normal view may be received by a double tap or a double click on or near the hyperlink. In the illustrated embodiment, double tap 424 is received on the hyperlink. Upon returning to normal view, the document is displayed in window 401 as illustrated by FIG. 4A.

Figure 4D:
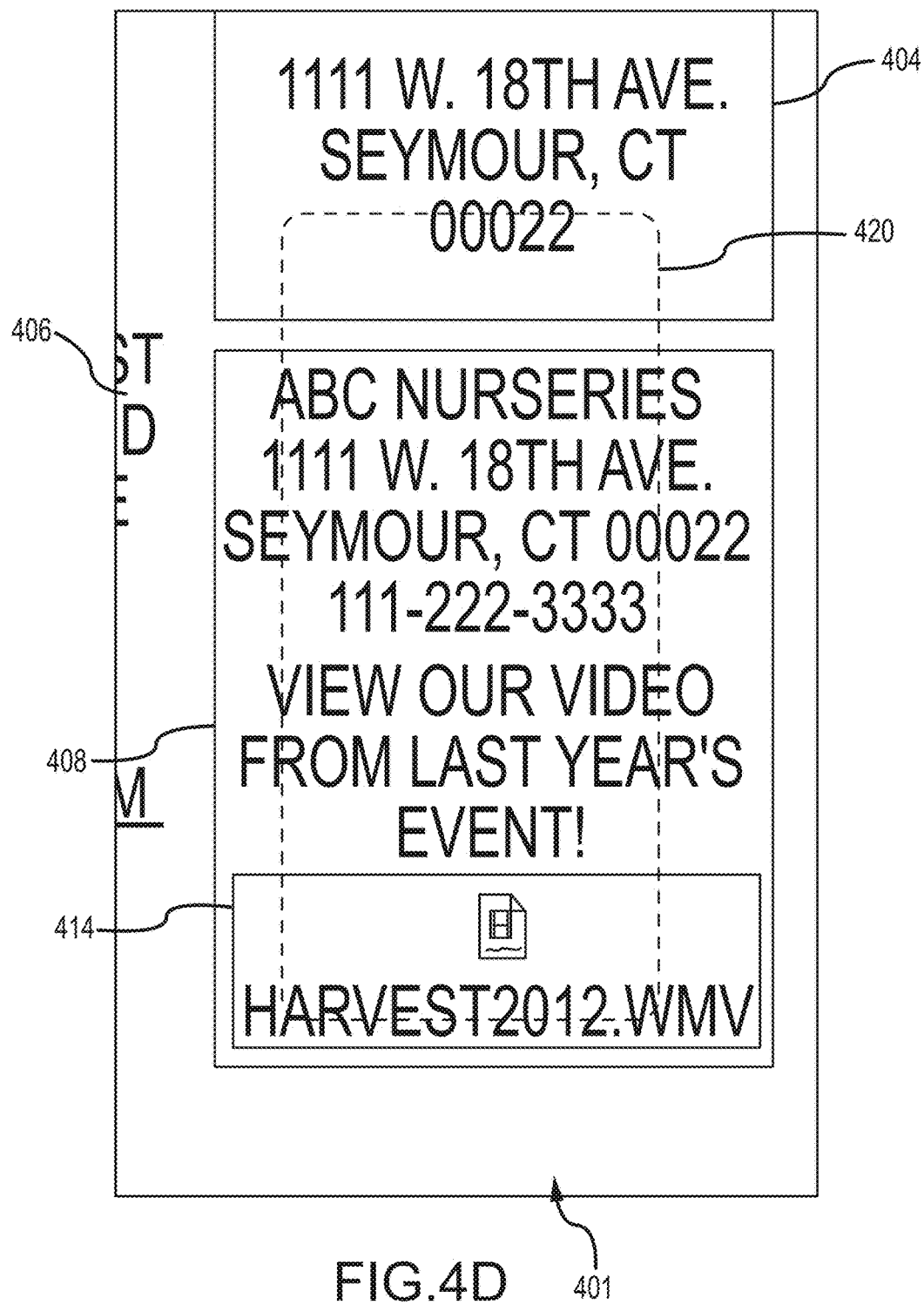

FIG. 4D illustrates embodiments of content displayed with contextual zoom focus in a document.

In alternative embodiments, upon returning to normal view, other portions of document 400 may be selected. For example, a selection of element 414 may be received. Element 414 is a media file, e.g., a video file in Windows® media video (.wmv) format. In embodiments, a single tap or click on object 414 will play the media file.

Alternatively, in normal view, an object may be selected for contextual-zoom-focus. For example, object 408 may be selected for contextual-zoom-focus. As described above, object 408 may be selected for contextual-zoom-focus by a double tap or click, or a visible or invisible circle, on or near object 408. Upon selecting object 408 for contextual-zoom-focus, a size of object 408 may be increased and object 408 may be repositioned to a central area 420 of window 401. Moreover, a context for object 408 may be preserved in smart-zoom-focus view, e.g., other objects positioned near object 408 (e.g., portions of object 406 and object 404, and element 414) may be at least partially displayed in window 401. As described above, applying contextual-zoom-focus on object 408 may be animated, immediate, or some combination thereof.

When in smart-zoom-focus view, for example, element 414 may be selected. In some embodiments, a single tap or click on element 414 will play the media file. In alternative embodiments, element 414 may be selected for ultra-focus by a double tap or click, or a visible or invisible circle, on or near object 414. Upon selecting object 414 for ultra-focus, a size of object 414 may be increased and object 414 may be repositioned to a central area 420 of window 401. Moreover, a context for object 414 may be preserved in ultra-focus view, i.e., other objects positioned near object 414 (e.g., portions of object 408) may be at least partially displayed in window 401 (not shown). Further still, when in ultra-focus view, a single tap or click on element 414 may play the media file.

In further embodiments, when in ultra-focus view, a selection may be received to return to smart-zoom-focus view. As described above, a selection to return to smart-zoom-focus view may be received by a double tap or a double click in white space. Upon returning to smart-zoom-focus view, the document is displayed in window 401 as illustrated by FIG. 4D.

As described above, when in smart-zoom-focus view, a selection may be received to return to normal view. As described above, a selection to return to normal view may be received by a double tap or a double click in white space. Upon returning to normal view, the document is displayed in window 401 as illustrated by FIG. 4A.

As should be appreciated, embodiments illustrated and described with reference to FIGS. 4A-4D are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

FIGS. 5A-5D illustrate embodiments for displaying content with dynamic zoom focus.

Figure 5A:
FIGS. 5A-5D illustrate embodiments for displaying content with dynamic zoom focus.

FIG. 5A illustrates an embodiment for displaying content. For example, content may be viewed in any suitable manner, e.g., in a window 502 of a computing device. In some embodiments, the computing device may be equipped with a touch screen.

As described above, content that is displayed or presented in real time, e.g., during a presentation, collaborative viewing, or other display of the content, is provided in a presentation mode. In contrast, during preparations for a subsequent presentation or display of content, content may be accessed and manipulated in an edit mode. Unless stated otherwise, embodiments described herein are illustrated in presentation mode.

As illustrated, the displayed content is an image of a map. As described above, content may comprise one or more portions (elements, sub-elements, etc.) such as shapes, text, icons, images, hyperlinks, media files, etc. As illustrated, the displayed content comprises elements 504, 506 and 508, which are circular shapes identifying locations on the map.

Figure 5B:
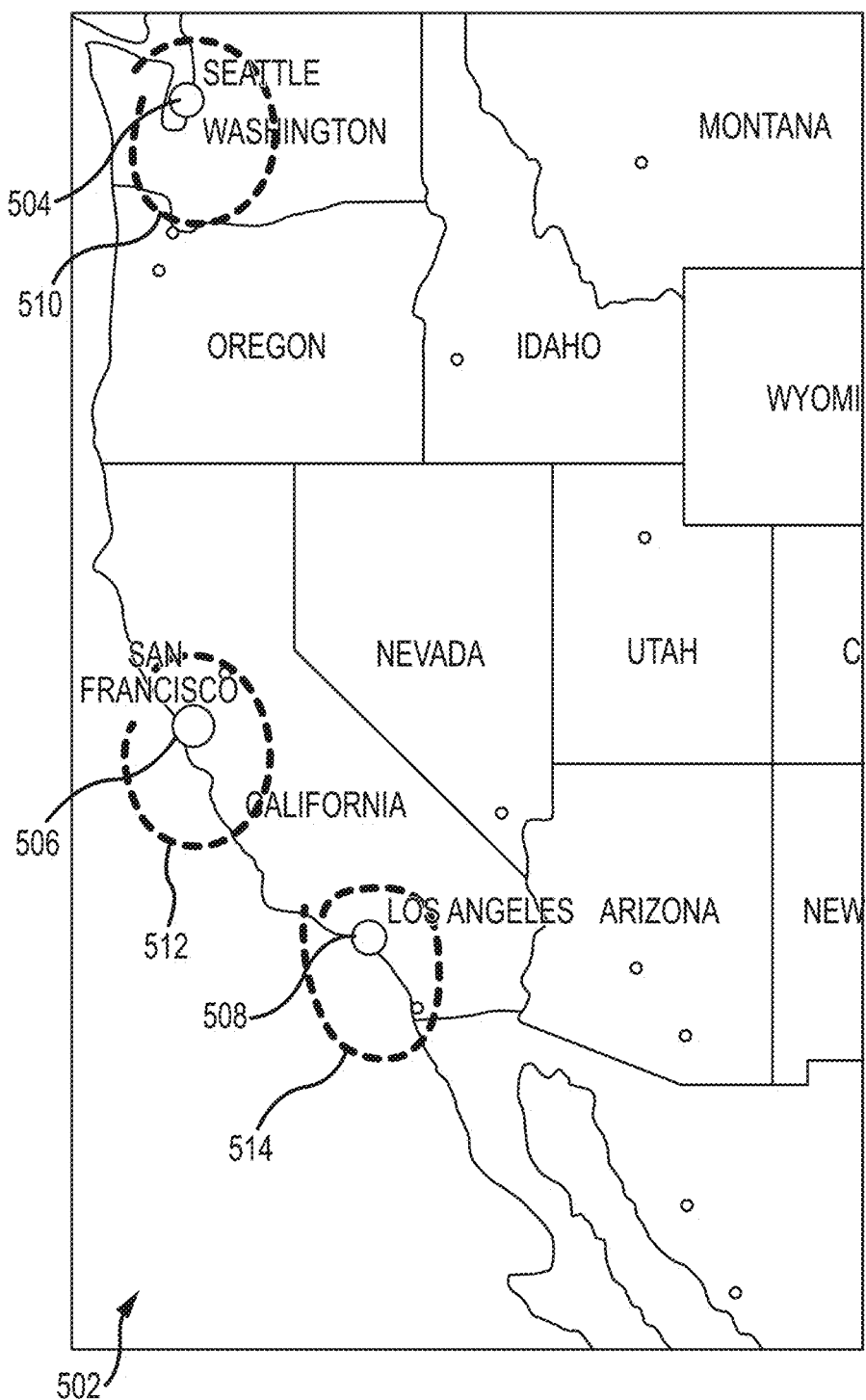

FIG. 5B illustrates an embodiment for progressively displaying dynamic-zoom-focused content.

In embodiments, when viewing or presenting content in window 502, it may be desirable to emphasize less than all of the content. For example, it may be desirable to emphasize a particular portion of content or to guide a discussion from one element of the content to another during a presentation. In other cases, it may be desirable to increase a size of a portion of content to improve viewing or clarity of the displayed content. Moreover, in some situations, it may be desirable to emphasize content in an ordered or sequential fashion.

In embodiments, content that is displayed or presented in real time, e.g., during a presentation, collaborative viewing, or other display of the content, is provided in a presentation mode. Additionally, during a presentation mode, a slide (or document, image, etc.) can be provided in two or more additional modes, e.g., a first control mode and a second audience mode. That is, a speaker or presenter can be operating a computer, tablet or smartphone that displays the slide on the computer, tablet or smartphone to the speaker or presenter. The slide is also separately displayed to an audience via a wired or wireless connection to a projector or other external display. The speaker or presenter can activate commands or controls that are visible on the display viewed by the speaker or presenter, but the presence of the commands and controls are not visible to the audience. In essence, the presenter or speaker views and accesses a control mode of the slide, while the audience views the audience mode of the slide. In embodiments associated with the presentation mode, as illustrated by FIG. 5B and described in more detail below, the invisible circles 510, 512, and 514 (identified by dashed lines) are viewable by the speaker or presenter in the control mode of the slide, but the audience only sees the slide content zooming, focusing and moving in the audience mode of the slide that is separately displayed to the audience.

In embodiments, placing dynamic-zoom-focus on a portion of content, or element, may be triggered by receiving a selection of the element. In turn, selection of the element may be received by a double tap on or near the element using a stylus or touch. In other embodiments, selection of the element may be received by a double click on or near the element using a mouse or short-cut keys on a keyboard. In still other embodiments, selection of the element may be received by visibly or invisibly drawing a shape around the element, e.g., a circular shape.

As described above, placing dynamic-zoom-focus on an element may include increasing a size of the content and centering the element within a viewing window. That is, in embodiments, the image of the map may increase in size (zoom) and the element may be repositioned to a central area of the window (focus). Additionally, in some cases, dynamic-zoom-focus may be animated, i.e., the content may perceptively increase in size and the element may glide to a central area of the viewing window.

In embodiments, a sequence for progressively displaying content (dynamic) may be received by serially selecting elements. In some embodiments, serial selection of elements may be received during a live presentation or display of content, e.g., during a presentation mode. For example, a first selection of a first element may be received, and then a second selection of a second element may be received, and then a third selection of a third element may be received, and so on.

In embodiments, the first selection, second selection and third selection may be received within a selection delay period. The selection delay period is a period of time after the first selection and before focus is placed on the first element. If additional selections are made during the selection delay period, serialized dynamic-zoom-focus is initiated on each subsequently selected element. If additional selections are not made during the selection delay period, contextual-zoom-focus may be placed on the first element.

As illustrated by FIG. 5B, a first selection 510 of element 504 may be received in window 502. In this example, first selection 510 is an invisible circle drawn around element 504 (identified by a dashed line). Thereafter, a second selection 512 of element 506 may be received in window 502, the second selection 512 consisting of an invisible circle drawn around element 506 (identified by a dashed line). Thereafter, a third selection 514 of element 508 may be received in window 502, the third selection 514 consisting of an invisible circle drawn around element 508 (identified by a dashed line).

According to embodiments, based on the received serial selections, dynamic-zoom-focus may be placed on the first element, and then dynamic-zoom-focus may be placed on the second element, and then dynamic-zoom-focus may be placed on the third element, etc. In some embodiments, a predetermined delay period may be set between displaying the first dynamic-zoom-focused element and the second dynamic-zoom-focused element. In this case, dynamic-zoom-focus may be placed on the first element and, after the predetermined delay period, dynamic-zoom-focus may automatically shift to the second element, and after the predetermined delay period, dynamic-zoom-focus may automatically shift to the third element. In alternative embodiments, dynamic-zoom-focus may shift from the first element to the second element upon receiving a first control input, and dynamic-zoom-focus may shift from the second element to the third element upon receiving a second control input.

In some embodiments, dynamic-zoom-focus may be placed on the first element 504 by increasing a size of first element 504 and repositioning the first element 504 to a central area of window 502. Additionally, in embodiments, context may be maintained for the first element 504 by at least partially displaying one or more nearby elements to element 504 in window 502, as described above with respect to contextual-zoom-focus. Thereafter, dynamic-zoom-focus may be placed on second element 506 by increasing a size of second element 506, repositioning the second element 506 to a central area of window 502, and maintaining context for second element 506. Thereafter, dynamic-zoom-focus may be placed on third element 508 by increasing a size of third element 508, repositioning the third element 508 to a central area of window 502, and maintaining context for third element 508.

In other embodiments, a size of the content as a whole may be increased when dynamic-zoom-focus is placed on the first element 504 and, thereafter, the view may shift to the second element 506 and then to the third element 508 without independently increasing the size of each element. In this case, the image of the map displayed in window 502 may be increased and first element 504 may be repositioned to a central area of window 502, while maintaining context for first element 504. Thereafter, dynamic-zoom-focus may be placed on second element 506 by repositioning the second element 506 to a central area of window 502, while maintaining context for second element 506, and then dynamic-zoom-focus may be placed on third element 508 by repositioning the third element 508 to a central area of window 502, while maintaining context for the third element 508.

In some cases, shifting dynamic-zoom-focus from a first element to a second element, and then from a second element to a third element may be animated. For example, the second element may perceptively glide into the central area of window 502, replacing the first element. Thereafter, the third element may perceptively glide into the central area of window 502, replacing the second element. In other cases, shifting dynamic-zoom-focus may be immediate, i.e., the view of window 502 may quickly transition, or flash, from displaying first element 504 in a central area of window 502, to displaying second element 506 in the central area of window 502, to displaying third element 508 in the central area of window 502.

Figure 5C:
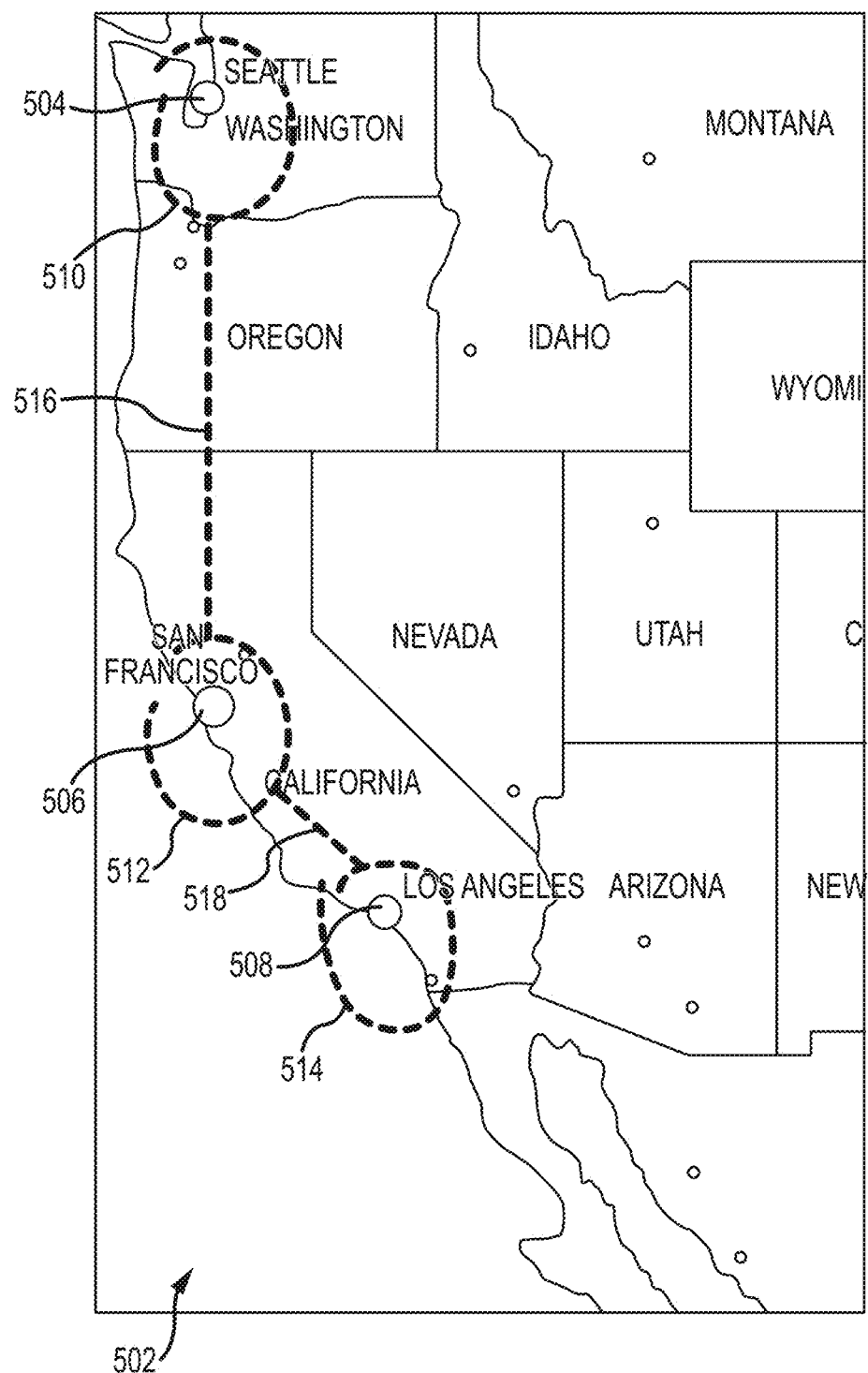

FIG. 5C illustrates an embodiment for progressively displaying dynamic-zoom-focused content along a path.

As described above, when viewing or presenting content in window 502, it may be desirable to emphasize less than all of the content. For example, it may be desirable to emphasize a particular portion of content or to guide a discussion from one element of the content to another during a presentation. In other cases, it may be desirable to increase a size of a portion of content to improve viewing or clarity of the displayed content. With reference to FIG. 5B, embodiments for emphasizing content in an ordered or sequential fashion are described. In this case, dynamic-zoom-focus shifts from one selected portion of content to another, but intervening content may not be displayed. Accordingly, it may also be desirable to emphasize content in a sequential fashion, while also allowing intervening content to be viewed.

As described above, content that is displayed or presented in real time, e.g., during a presentation, collaborative viewing, or other display of the content, is provided in a presentation mode. For example, during a presentation mode, a slide can be provided in two or more additional modes, e.g., a first control mode and a second audience mode. In embodiments associated with the presentation mode, as illustrated by FIG. 5C and described in more detail below, the invisible circles 510, 512, and 514 (identified by dashed lines), and the connectors 516 and 518 (identified by dashed lines), are viewable by the speaker or presenter in the control mode of the slide, but the audience only sees the slide content zooming, focusing and moving in the audience mode of the slide that is separately displayed to the audience.

In embodiments, an indication of a path for progressively displaying dynamic-zoom-focused content may be received by identifying a connector between a first element and a second element of the content. In some embodiments, the first element and the second element may not be otherwise selected for dynamic-zoom-focus, but may signify a starting point and an ending point for displaying the content in a sequential fashion. In other embodiments, the first element and the second element may further be selected for dynamic-zoom-focus. In the embodiment shown, elements are first selected for dynamic-zoom-focus and then connectors between elements are identified; however, in other embodiments, a connector may first be identified and then elements may be selected for dynamic-zoom-focus. In either embodiment, a first element selected may indicate a starting point and a last element selected may indicate an ending point for the path.

In embodiments, a connector may consist of a visible line or an invisible line, e.g., drawn by a stylus or by touch, between the first and second elements. In some cases, the connector may consist of a substantially straight line between the first and second elements. Alternatively, the connector may consist of a substantially curved or twisted line between the first and second elements. Alternatively still, the connector may consist of any combination thereof.

In further embodiments, a plurality of connectors may be received. In some embodiments, a second connector may be identified between the second element and a third element. In other embodiments, a second connector may be identified between a third element and a fourth element. Thus, connectors between elements may be continuous or discontinuous and any number of connectors may be identified. As illustrated, a first connector 516 may be received between first element 504 and second element 506; and a second connector 518 may be received between second element 506 and third element 508. As illustrated, first connector 516 is a substantially straight, invisible line (represented by a dashed line); and second connector 518 is also a substantially straight, invisible line (represented by a dashed line).

In some embodiments, in addition to identifying the connectors, one or more portions of content, or elements, may also be selected for dynamic-zoom-focus. For example, a first selection 510 of element 504 may be received in window 502. In this example, first selection 510 is an invisible circle drawn around element 504 (identified by a dashed line). Thereafter, a second selection 512 of element 506 may be received in window 502, the second selection 512 consisting of an invisible circle drawn around element 506 (identified by a dashed line). Thereafter, a third selection 514 of element 508 may be received in window 502, the third selection 514 consisting of an invisible circle drawn around element 508 (identified by a dashed line). In embodiments, identification of connectors and selection of elements may be received during a live presentation or display of content, e.g., in a presentation mode.

According to embodiments, content may be dynamic-zoom-focused along a path between two elements, as determined by the received connector. That is, when a connector is substantially straight, dynamic-zoom-focus may follow a substantially straight path between the two elements. Alternatively, when a connector substantially curved or twisted, dynamic-zoom-focus may follow a substantially curved or twisted path between the two elements.

A described above, a first element may signify a starting point for the path. In order to follow the path, in embodiments, a size of the content may be increased (or zoomed), the starting point may be repositioned to a central area of window 502, and context may be maintained for the starting point within the content. If the first element was not selected for dynamic-zoom-focus, dynamic-zoom-focus may glide away from the first element along the path toward the second element. In embodiments, the view may be continuously adjusted such that the path falls in the central area of the window as content is displayed. Accordingly, in embodiments, content along the path and on either side of the path is displayed in window 502. Moreover, in at least some embodiments, the path itself (such as the line) is not displayed in window 502. Additionally, for example, the view may glide along the path at a particular rate, e.g., a default rate or a rate selected by a user.

In alternative embodiments, if the first element was selected for dynamic-zoom-focus, dynamic-zoom-focus may remain on the first element before starting to glide along the path. In some cases, dynamic-zoom-focus may remain on the first element for a predetermined delay period. In other cases, dynamic-zoom-focus may remain on the first element until a control input is received.

As may be appreciated, one or more elements may be selected for dynamic-zoom-focus along the path between the first and second elements (not shown). In this case, according to embodiments, dynamic-zoom-focus may glide along the path until the selected element is positioned in a central area of window 512. Dynamic-zoom-focus may remain on the selected element for a predetermined delay period, or until a control input is received.

As illustrated by FIG. 5C, element 504 was selected for dynamic-zoom-focus. Thus, according to embodiments, dynamic-zoom-focus may be placed on element 504 by increasing a size of the content, repositioning element 504 to a central area of window 502, and maintaining context for element 504 in window 502. Dynamic-zoom-focus may remain on element 504 for a predetermined delay period or until a control input is received.

After a predetermined delay period, or upon receiving a control input, dynamic-zoom-focus may proceed to float along a path determined by connector 516 toward element 506. In this case, in embodiments, the view of window 502 may be continuously adjusted such that the path falls in a central area of the window as content is displayed. In further embodiments, content on either side of the path is displayed in window 502. In some embodiments, the view may glide along the path at a particular rate, e.g., a default rate or a rate selected by a user.

As illustrated, element 506 was also selected for dynamic-zoom-focus. Dynamic-zoom-focus may be placed on element 506 by repositioning element 506 to a central area of window 502 and maintaining context for element 506 in window 502. Dynamic-zoom-focus may remain on element 506 for a predetermined delay period or until a control input is received.

After a predetermined delay period, or upon receiving a control input, dynamic-zoom-focus may proceed to float along a path determined by connector 518 toward element 508. In this case, in embodiments, the view of window 502 may be continuously adjusted such that the path falls in a central area of the window as content is displayed. In further embodiments, content on either side of the path is displayed in window 502. In embodiments, in addition to maintaining context for elements selected for dynamic-zoom-focus, context may be maintained within the content as the view flows through the content. That is, context may be provided by displaying various elements along the path based on an arrangement of the elements within the content.

Element 508 was also selected for dynamic-zoom-focus. Thus, according to embodiments, dynamic-zoom-focus may be placed on element 508 by repositioning element 508 to a central area of window 502 and maintaining context for element 508 in window 502. Dynamic-zoom-focus may remain on element 508 for a predetermined delay period or until a control input is received.

Figure 5D:
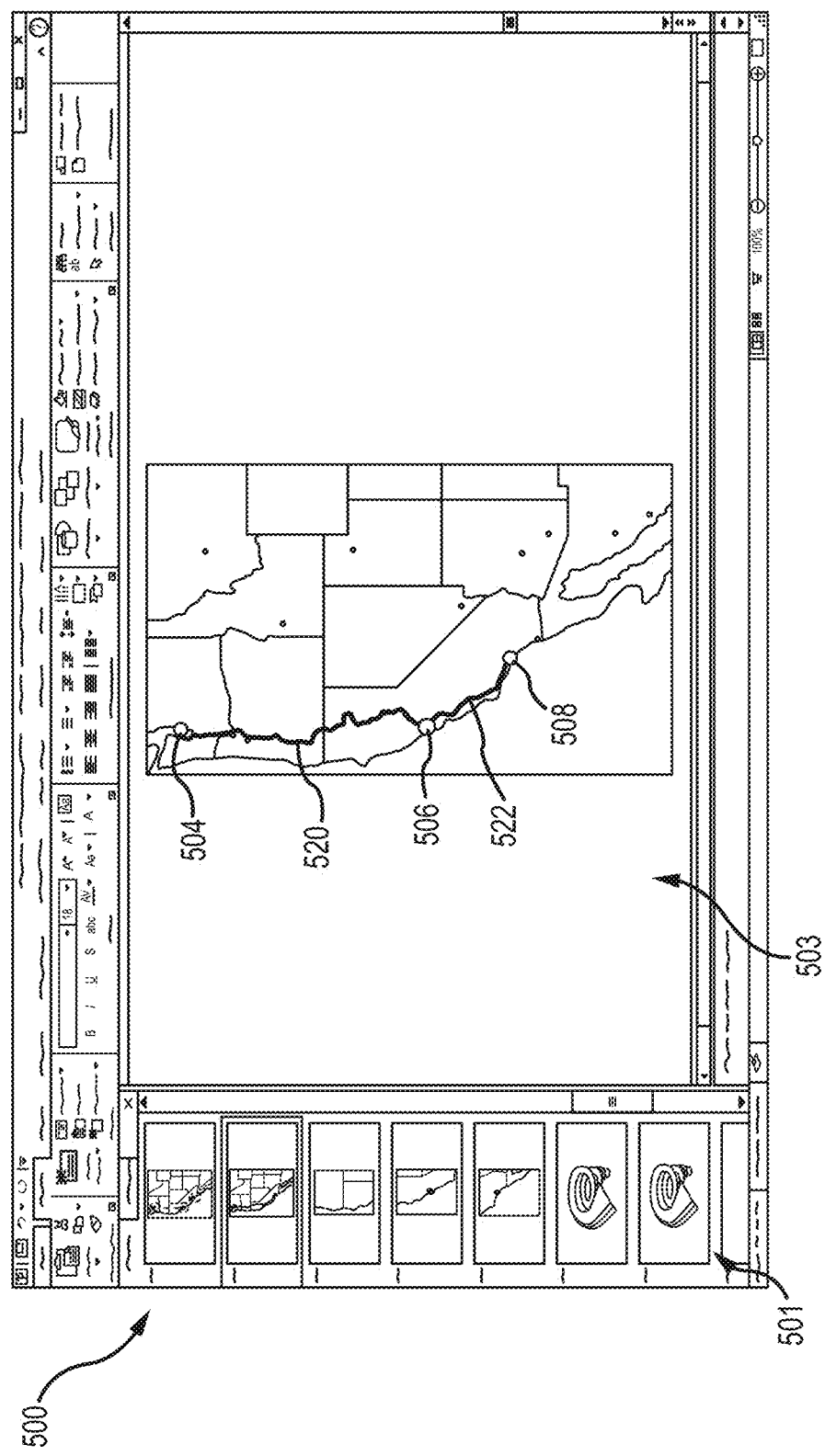

FIG. 5D illustrates an alternative embodiment for progressively displaying dynamic-zoom-focused content along a path.

As described above, an indication of a path for progressively displaying dynamic-zoom-focused content may be received by identifying a connector between a first element and a second element during a presentation mode. Alternatively, as illustrated by FIG. 5D, an indication of a path between a first and second element may be received during an edit mode.

In embodiments, content that is displayed or presented in real time, e.g., during a presentation, collaborative viewing, or other display of the content, is provided in a presentation mode. For example, during presentation mode, a slide can be provided in two or more additional modes, e.g., a first control mode and a second audience mode, as described above.

In contrast, during preparations for a subsequent presentation or display of content, content may be accessed and manipulated in an edit mode. An edit mode may be provided in a presentation application, such as Microsoft® PowerPoint®, but edit modes for other applications may also be applicable. Generally, an edit mode allows one to create and modify content for later display or presentation. As illustrated by FIG. 5D, an edit mode of a presentation application 500 may comprise multiple windows or panes for viewing content. For example, slide pane 501 may display a minimized copy of each slide in the presentation, and edit pane 503 may display an enlarged view of a slide that is currently being created or edited.

In embodiments, a connector between two elements of content may be received during an edit mode. As detailed above, a connector may consist of a line between the first and second elements. Although the connector may be drawn as a visible line in the edit mode, the connector may not be displayed during presentation mode. In some cases, the connector may consist of a substantially straight line between the first and second elements. Alternatively, the connector may consist of a substantially curved or twisted line between the first and second elements. Alternatively still, the connector may consist of any combination thereof.

Similar to connectors received during presentation mode, a plurality of connectors may be received during edit mode. In some embodiments, a second connector may be identified between the second element and a third element. In other embodiments, a second connector may be identified between a third element and a fourth element. Thus, connectors between elements may be continuous or discontinuous and any number of connectors may be identified. As illustrated, a first connector 520 may be received between first element 504 and second element 506 in the edit pane 503. Additionally, a second connector 522 may be received between second element 506 and third element 508. As illustrated, first connector 520 is a substantially twisted, visible line; and second connector 522 is also a substantially twisted, visible line.

In some embodiments, in addition to identifying the connectors, one or more portions of content, or elements, may also be selected for dynamic-zoom-focus in an edit mode. As illustrated, elements 504, 506 and 508 were not selected for dynamic-zoom-focus.

After receiving connectors and selected elements during edit mode, the presentation application 500 is placed into presentation mode for display of the content. Accordingly, in embodiments, dynamic-zoom-focused display of content along a path would proceed in the same or similar way as described above with reference to FIG. 5C.

As should be appreciated, embodiments illustrated and described with reference to FIGS. 5A-5D are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

Figure 6A:
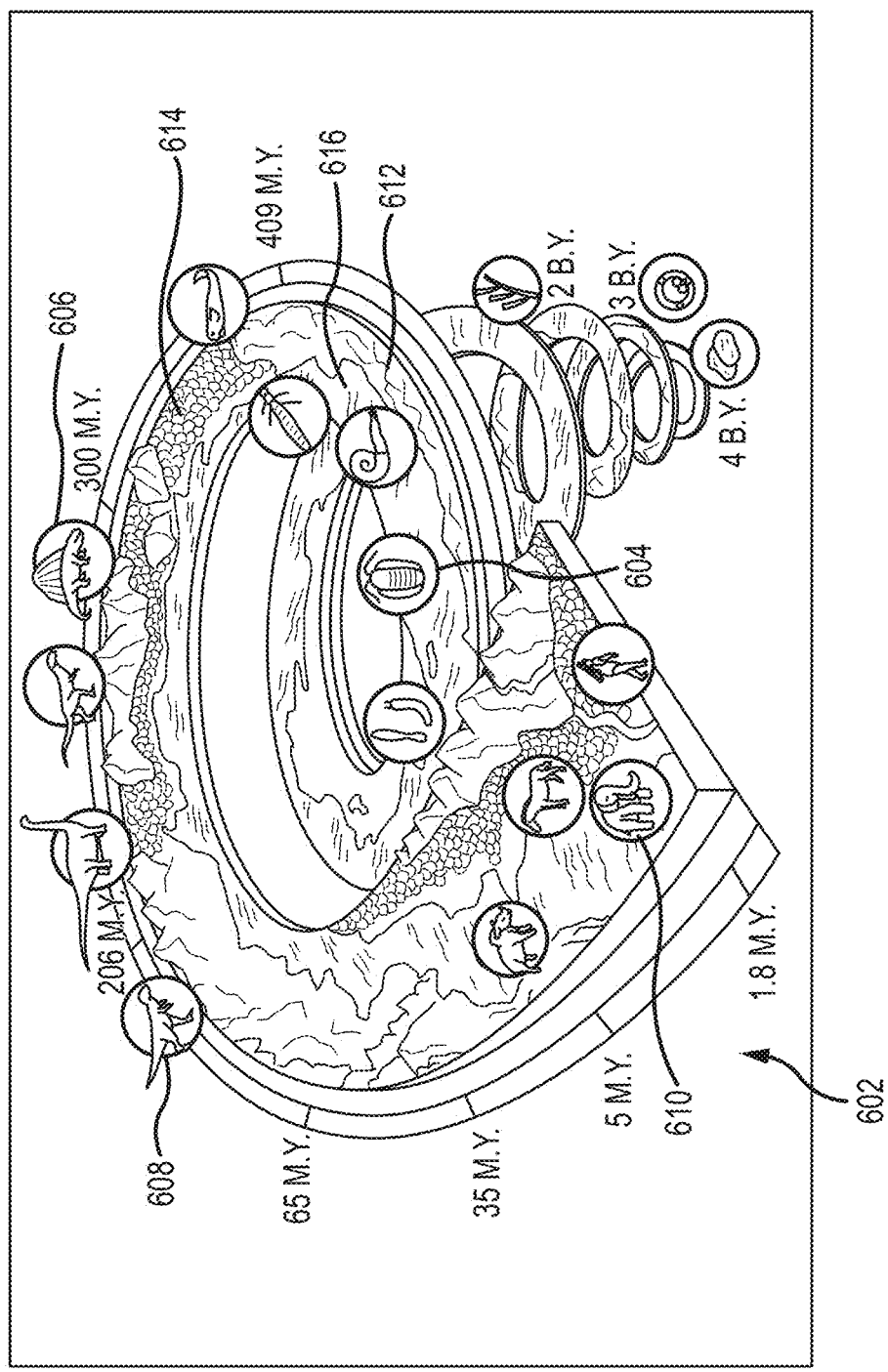
FIGS. 6A-6C illustrate additional embodiments for displaying content with dynamic zoom focus.
Figure 6B:
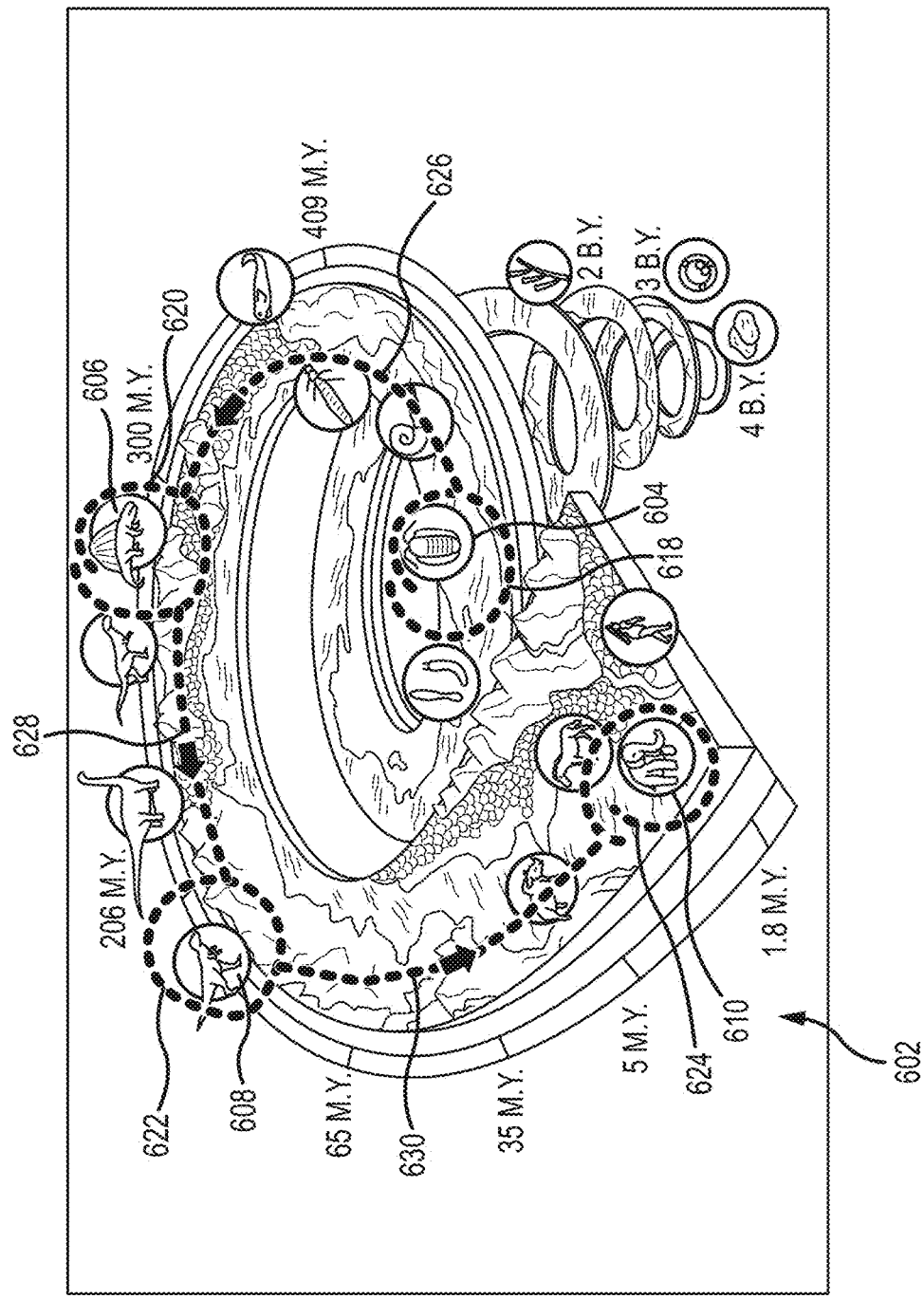
Figure 6C:
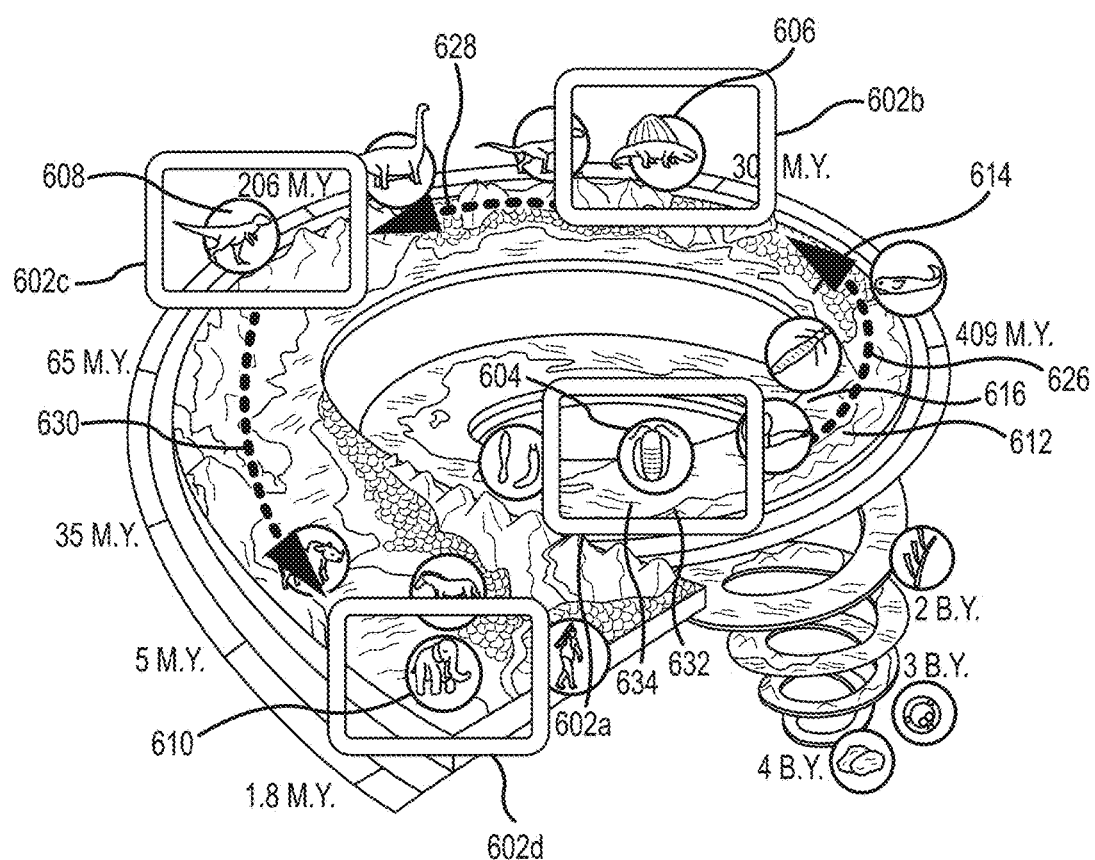

FIGS. 6A-6C illustrate additional embodiments for displaying content with dynamic zoom focus.

FIG. 6A illustrates an embodiment for displaying content. For example, content may be viewed in any suitable manner, e.g., in a window 602 of a computing device. In some embodiments, the computing device may be equipped with a touch screen.

As illustrated, the displayed content is an image of a chronological map. As described above, content may comprise one or more portions (elements, sub-elements, etc.) such as shapes, text, icons, images, hyperlinks, media files, etc. As illustrated, the displayed content comprises elements 604, 606, 608 and 610, which are images of prehistoric animals. The displayed content further displays various other elements, such as images of mountains (e.g., element 612), images of land masses (e.g., element 614), and images of bodies of water (e.g., element 616).

FIG. 6B illustrates an embodiment for progressively displaying dynamic-zoom-focused content.

In embodiments, when viewing or presenting content in window 602, it may be desirable to emphasize less than all of the content. For example, it may be desirable to emphasize a particular portion of content and/or to guide a discussion from one element of the content to another during a presentation. In other cases, it may be desirable to increase a size of a portion of content to improve viewing or clarity of the displayed content. Moreover, in some situations, it may be desirable to emphasize content in an ordered or sequential fashion.

In embodiments, placing dynamic-zoom-focus on a portion of content, or element, may be triggered by receiving a selection of the element. In turn, selection of the element may be received by a double tap on or near the element using a stylus or touch. In other embodiments, selection of the element may be received by a double click on or near the element using a mouse or short-cut keys on a keyboard. In still other embodiments, selection of the element may be received by visibly or invisibly drawing a shape around the element, e.g., a circular shape.

As described above, placing dynamic-zoom-focus on an element may include increasing a size of the content and centering the element within a viewing window. That is, in embodiments, the image of the map may increase in size (zoom) and the element may be repositioned to a central area of the window (focus). Moreover, context may be maintained for the object by at least partially displaying one or more nearby elements in the window. Additionally, in some cases, dynamic-zoom-focus may be animated, i.e., the content may perceptively increase in size and the element may glide to a central area of the viewing window.

In embodiments, a sequence for progressively displaying content (dynamic) may be received by serially selecting elements. In some embodiments, serial selection of elements may be received during a live presentation or display of content, e.g., during a presentation mode. For example, a first selection of a first element may be received, and then a second selection of a second element may be received, then a third selection of a third element may be received, and then a fourth selection of a fourth element may be received, and so on.

As illustrated by FIG. 6B, a first selection 618 of first element 604 may be received in window 602. In this example, first selection 618 is an invisible circle substantially enclosing first element 604 (identified by a dashed line). Thereafter, a second selection 620 of second element 606 may be received in window 602, e.g., the second selection 620 consisting of an invisible circle substantially enclosing second element 606 (identified by a dashed line). Thereafter, a third selection 622 of third element 608 may be received in window 602, e.g., the third selection 622 consisting of an invisible circle substantially enclosing third element 608 (identified by a dashed line). Thereafter, a fourth selection 624 of fourth element 610 may be received in window 602, e.g., the fourth selection 624 consisting of an invisible circle substantially enclosing fourth element 610 (identified by a dashed line).

In further embodiments, an indication of a path for progressively displaying content (dynamic) may be received by identifying a connector between a first element and a second element of the content. In embodiments, a connector may consist of a visible or an invisible line, e.g., drawn by a stylus or by touch, between the first and second elements. In some cases, the connector may consist of a substantially straight line between the first and second elements. Alternatively, the connector may consist of a substantially curved or twisted line between the first and second elements. Alternatively still, the connector may consist of any combination thereof.

In further embodiments, a plurality of connectors may be received. In some embodiments, a second connector may be identified between the second element and a third element. In other embodiments, a second connector may be identified between a third element and a fourth element. Thus, connectors between elements may be continuous or discontinuous and any number of connectors may be identified. As illustrated, a first connector 626 may be received between first element 604 and second element 606; a second connector 628 may be received between second element 606 and third element 608; and a third connector 630 may be received between third element 608 and fourth element 610. As illustrated, first connector 626 is a substantially curved, invisible line (represented by a dashed line); second connector 628 is also a substantially curved, invisible line (represented by a dashed line); and third connector 630 is also a substantially curved, invisible line (represented by a dashed line).

FIG. 6C illustrates an embodiment of maintaining context for progressively displayed dynamic-zoom-focused content.

According to embodiments, content may be dynamic-zoom-focused along a path between two elements, as determined by the received selections and connectors described with reference to FIG. 6B above. That is, when a connector is substantially straight, dynamic-zoom-focus may follow a substantially straight path between the two elements. Alternatively, when a connector substantially curved or twisted, dynamic-zoom-focus may follow a substantially curved or twisted path between the two elements.

In other embodiments, a path may be automatically generated upon selection of a second element. For instance, similar to an embodiment described above with respect to shifting contextual-zoom-focus from one element to another (see, e.g., FIGS. 1C and 5B). For instance, when contextual-zoom-focus has been placed on a first element, a single tap may be received on or near a second element (or in an area of the window toward the second element). In some embodiments, a path may be automatically calculated between the first element and the second element. Thereafter, the second element may perceptively glide along the generated path to replace the first element in the central area of the window.

A described above, a first element may signify a starting point for the path. In order to follow the path, in embodiments, a size of the content may be increased (or zoomed), the starting point (i.e., the first element) may be repositioned to a central area of the window, and context for the starting point may be maintained (e.g., by at least partially displaying nearby elements). In embodiments, if the first element was selected for dynamic-zoom-focus, the view of the window may remain on the first element for a predetermined period of time, or until a control input is received, before gliding to the second element along the path. As illustrated, view 602a displays an enlarged form of first element 604, along with context for first element 604, such as element 632, which is a nearby image of mountains, and element 634, which is a nearby image of a body of water.

Upon reaching the period of time or receiving a control input, the view may begin to glide from first element 604 to second element 606 along a path determined by connector 626. As illustrated, the path curves along the content from first element 604 to second element 606. In embodiments, the view may be continuously adjusted such that the path falls in the central area of the window as content is displayed. Accordingly, in embodiments, content along the path and on either side of the path is displayed in the window. In this case, context may be provided between the first element 604 and the second element 606. For example, as the view glides from the first element to the second element, various elements may be displayed along the path between the two elements, e.g., elements 612, 614 and 616 may be displayed. By displaying various elements along the path, context if provided for the first element and the second element within the content. For example, a distance between the two elements may be conveyed. Moreover, context for the content as a whole may be provided, e.g., a size of the content, number of elements in the content, etc.

As illustrated, second element 606 was also selected for dynamic-zoom-focus. Dynamic-zoom-focus may be placed on second element 606 by repositioning second element 606 to a central area of window 602b and maintaining context for second element 606. Dynamic-zoom-focus may remain on second element 606 for a predetermined delay period or until a control input is received.

After a predetermined delay period, or upon receiving a control input, dynamic-zoom-focus may proceed to float along a path determined by connector 628 toward third element 608. In this case, in embodiments, the view of window 602 may be continuously adjusted such that the path falls in a central area of the window as content is displayed. In further embodiments, content on either side of the path is displayed in window 602, providing context within the content, as described above.

As illustrated, third element 608 was also selected for dynamic-zoom-focus. Thus, according to embodiments, dynamic-zoom-focus may be placed on third element 608 by repositioning third element 608 to a central area of window 602c and maintaining context for third element 608. Dynamic-zoom-focus may remain on third element 608 for a predetermined delay period or until a control input is received.

After a predetermined delay period, or upon receiving a control input, dynamic-zoom-focus may proceed to float along a path determined by connector 630 toward fourth element 610. In this case, in embodiments, the view of window 602 may be continuously adjusted such that the path falls in a central area of the window as content is displayed. In further embodiments, content on either side of the path is displayed in window 602, providing context within the content, as described above.

As illustrated, fourth element 610 was also selected for dynamic-zoom-focus. Thus, according to embodiments, dynamic-zoom-focus may be placed on fourth element 610 by repositioning fourth element 610 to a central area of window 602d and maintaining context for fourth element 610. Dynamic-zoom-focus may remain on fourth element 610 for a predetermined delay period or until a control input is received.

As should be appreciated, embodiments illustrated and described with reference to FIGS. 6A-6C are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

Figure 7A:
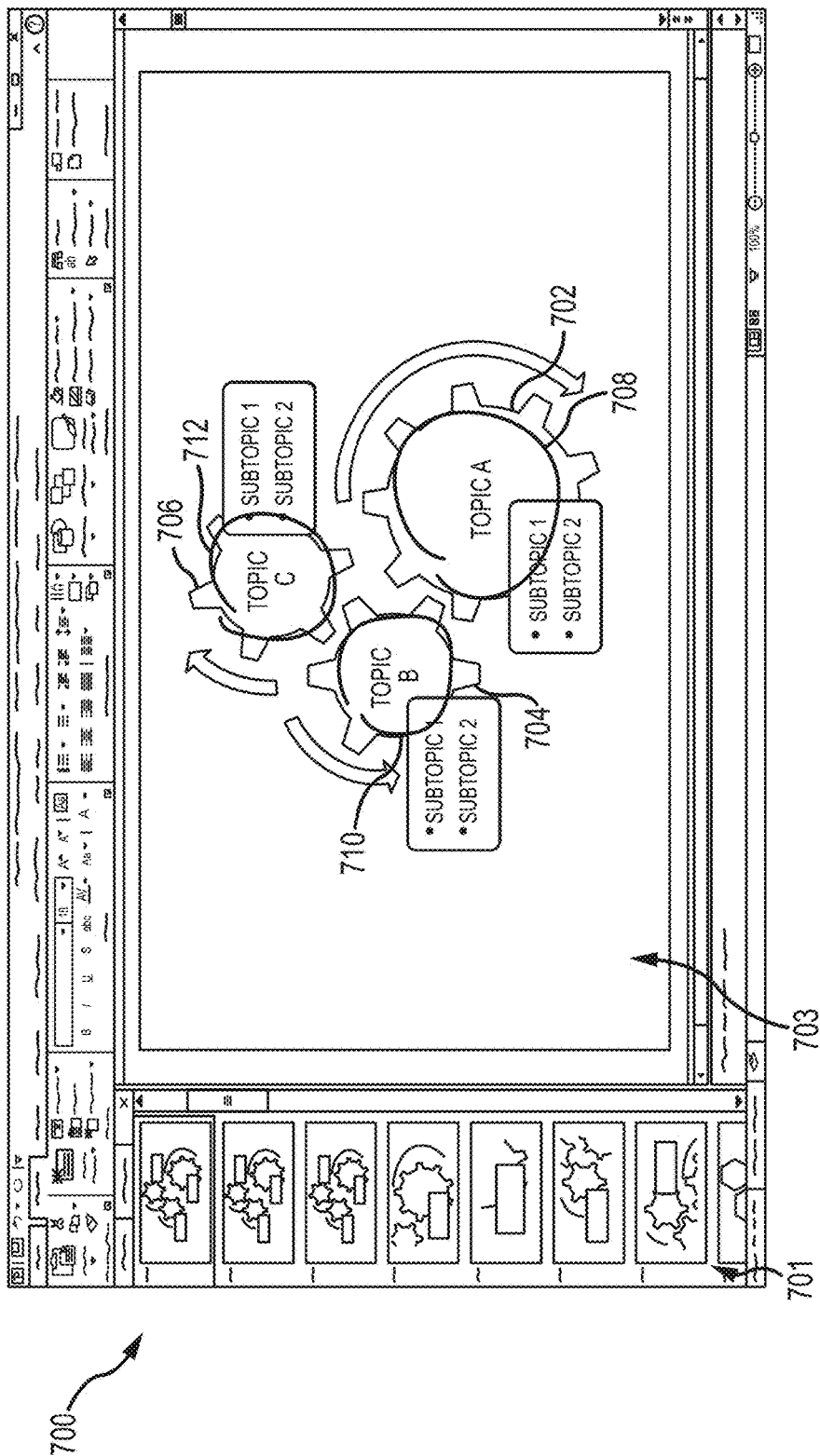
FIGS. 7A-7B illustrate alternative embodiments for displaying content with dynamic zoom focus.
Figure 7B:
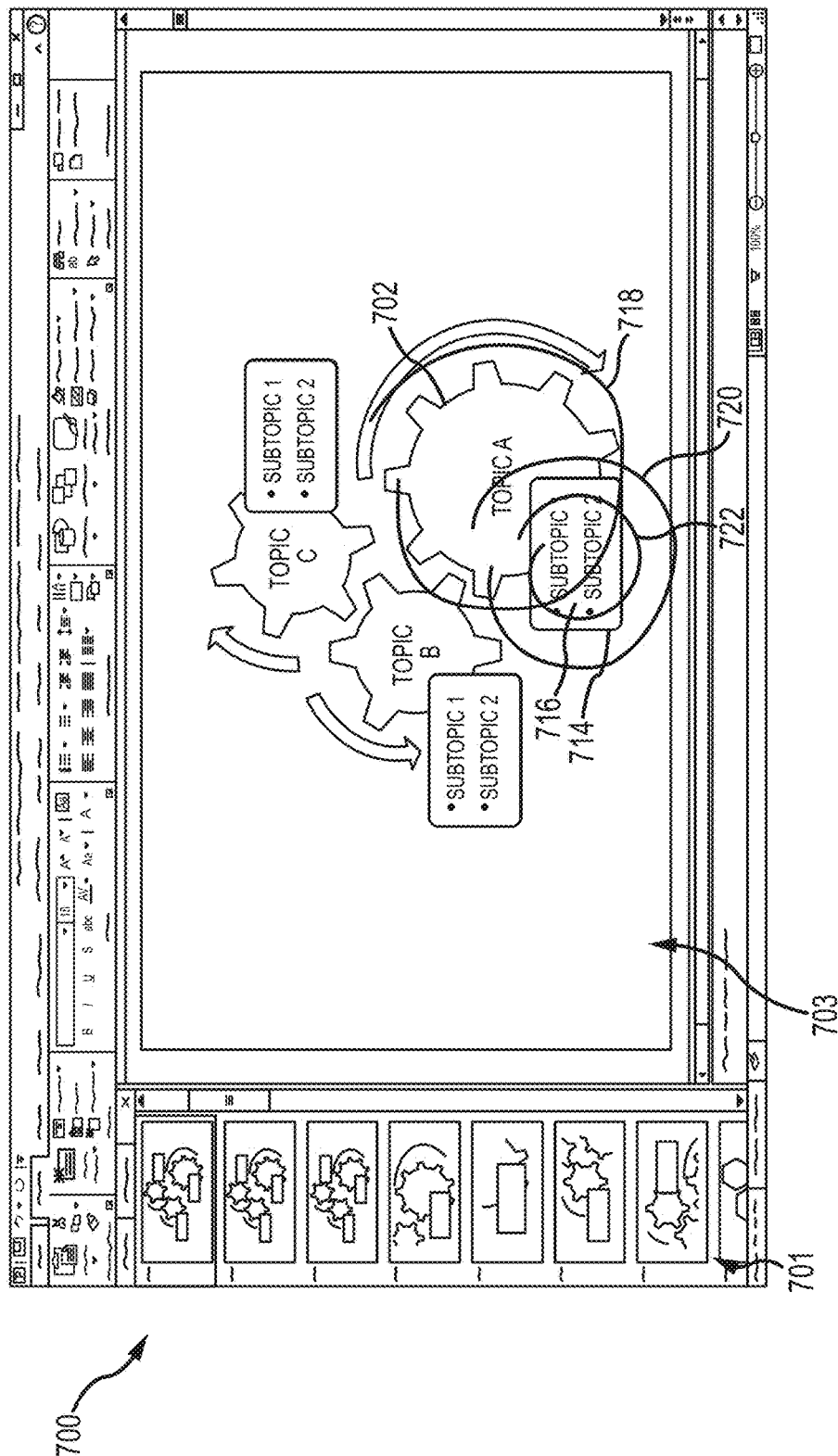

FIGS. 7A-7B illustrate alternative embodiments for displaying content with dynamic zoom focus.

FIG. 7A illustrates an alternative embodiment for progressively displaying dynamic-zoom-focused content.

As described above with reference to FIG. 5B, in some situations, it may be desirable to emphasize content in an ordered or sequential fashion.

In some embodiments, a sequence for progressively displaying dynamic-zoom-focused content may be received by serial selection of objects during a presentation mode, as illustrated by FIG. 5B. In alternative embodiments, a sequence for progressively displaying dynamic-zoom-focused content may be received by serial selection of objects during an edit mode, as illustrated by FIGS. 7A and 7B. Generally, an edit mode allows one to create and modify content for later display or presentation. As illustrated by FIG. 7A, an edit mode of a presentation application 700 may comprise multiple windows or panes for viewing content. For example, slide pane 701 may display a minimized copy of each slide in the presentation, and edit pane 703 may display an enlarged view of a slide that is currently being created or edited.

In embodiments, a first selection 708 of object 702 may be received in edit pane 703. In this example, first selection 708 is a visible circle drawn on object 702. Thereafter, a second selection 710 of object 704 may be received in edit pane 703, the second selection 710 consisting of a visible circle drawn on object 704. Thereafter, a third selection 712 of object 706 may be received in edit pane 703, the third selection 712 consisting of a visible circle drawn on object 706.

According to embodiments, based on the received serial selections in edit mode, dynamic-zoom-focus may be placed on the first object, and then dynamic-zoom-focus may be placed on the second object, and then dynamic-zoom-focus may be placed on the third object in presentation mode. Successive dynamic-zoom-focus of objects 702, 704 and 706 in presentation mode would be the same or similar to successive dynamic-zoom-focus of elements 504, 506 and 508, as described with reference to FIG. 5B.

FIG. 7B illustrates an alternative embodiment for progressively displaying dynamic-zoom-focused content.

As described above with reference to FIG. 5B, in some situations, it may be desirable to emphasize content in an ordered or sequential fashion.

In some embodiments, a sequence for progressively displaying dynamic-zoom-focused content may be received by serial selection of objects during a presentation mode, as illustrated by FIG. 5B. In alternative embodiments, a sequence for progressively displaying dynamic-zoom-focused content may be received by serial selection of objects during an edit mode, as illustrated by FIGS. 7A and 7B. As illustrated by FIG. 7B, an edit mode of a presentation application 700 may comprise multiple windows or panes for viewing content. For example, slide pane 701 may display a minimized copy of each slide in the presentation, and edit pane 703 may display an enlarged view of a slide that is currently being created or edited.

In embodiments, a first selection 718 of object 702 may be received in edit pane 703. In this example, first selection 718 is a visible circle drawn around object 702. Thereafter, a second selection 720 of element 714 may be received in edit pane 703, e.g., the second selection 720 consisting of a visible circle drawn around element 714. Thereafter, a third selection 722 of sub-element 716 may be received in edit pane 703, e.g., the third selection 722 consisting of a visible circle drawn around sub-element 716.

In some embodiments, during edit mode, the system may detect an order of selections based on an order in which the selections are received. However, in embodiments, a selection delay period may not be employed during edit mode. That is, a first selection of a first object may be made and then, at any later time, a second selection of a second object may be made. In other embodiments, an option may be available in edit mode for manually setting an order of a selection when the selection is entered or at any later time. In additional embodiments, an option may be available in edit mode for adjusting an order of the selections at any time.

According to embodiments, based on the order of the received serial selections in edit mode, dynamic-zoom-focus may be placed on the element 702, and then dynamic-zoom-focus may be placed on element 714, and then dynamic-zoom-focus may be placed on sub-element 716 in presentation mode. Successive dynamic-zoom-focus of object 702, element 714 and sub-element 716 in presentation mode would be the same or similar to successive contextual-zoom-focus of elements 504, 506 and 508, as described with reference to FIG. 5B. Additionally, embodiments for contextual-zoom-focusing on object 204, element 206 and sub-elements 224 and 226 in presentation mode are described with reference to FIGS. 2A-2C. These embodiments would be similar for applying serialized dynamic-zoom-focus to object 702, element 714 and sub-element 716 in a presentation mode.

As should be appreciated, embodiments illustrated and described with reference to FIGS. 7A-7B are provided for purposes of explanation and are not intended to be limiting. Indeed, the illustrated embodiments may be suitable for application with any number of hardware, software, or network environments whether or not explicitly described herein, e.g., suitable for computing systems with or without touch screen capabilities, suitable over wide or local area networks, suitable using web-based or local presentation software, suitable in collaborative, shared or local environments, etc.

Figure 8:
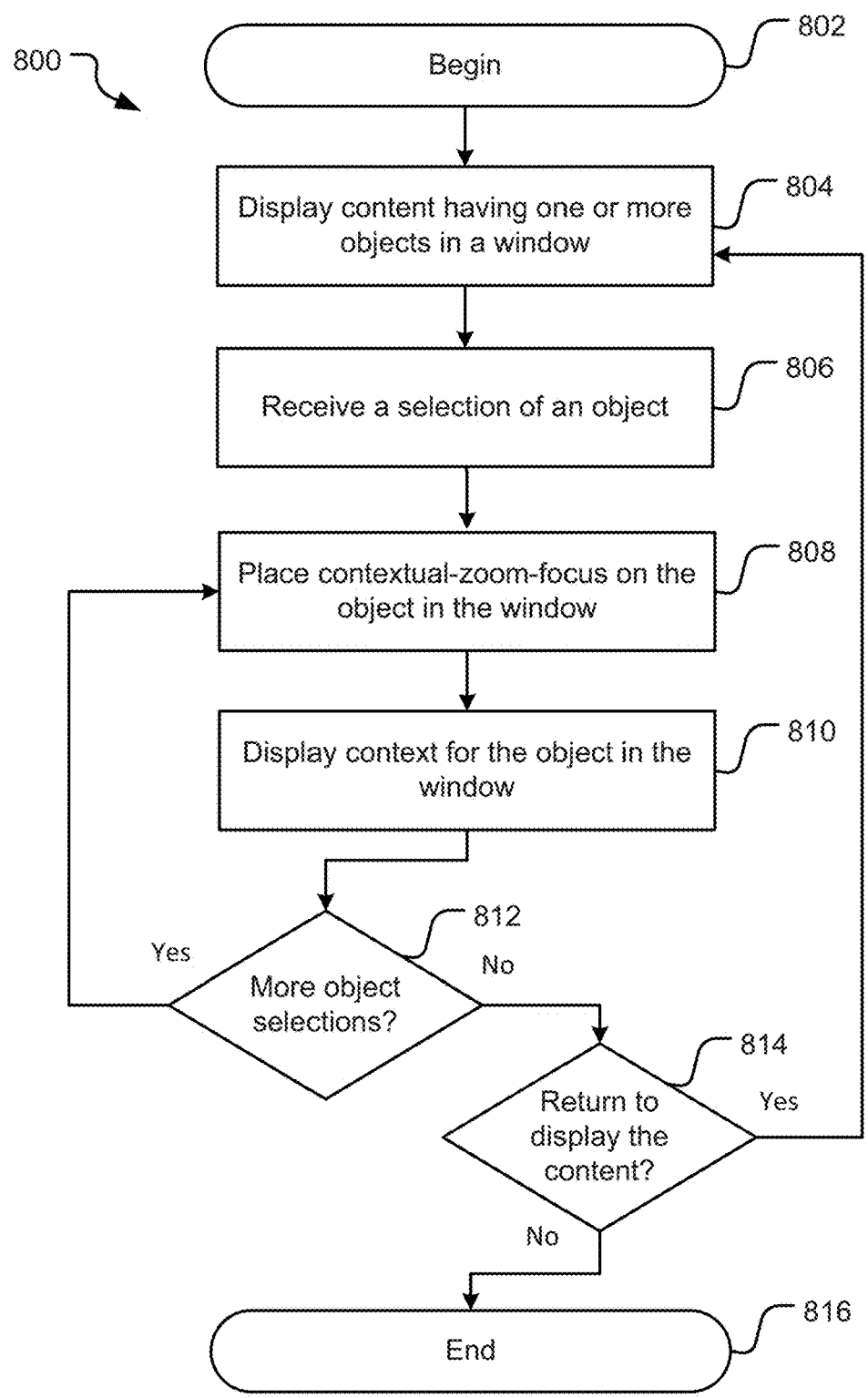
FIG. 8 is a flow diagram representing an embodiment of a method for displaying content with contextual zoom focus.

FIG. 8 is a flow diagram representing an embodiment of a method for displaying content with contextual zoom focus.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the present disclosure.

The method 800 of FIG. 8 begins with begin operation 802. Begin operation 802 may refer to any suitable initiation of a method for displaying content with contextual zoom focus. For example, begin operation may initiate a presentation application or other application for displaying or presenting content.

At display operation 804, content having one or more objects may be displayed in a window, e.g., a window associated with a computing device. According to some embodiments, the content comprises a plurality of objects displayed in a configuration, or an arrangement, within the window. That is, with respect to an object of the plurality of objects, some objects are displayed near the object and other objects are displayed farther away from the object in the arrangement. In other embodiments, objects are not displayed near other objects within the content, or the content comprises a single object.

At receive selection operation 806, a selection of an object may be received. For example, selection of an object may be received by a double tap on or near the object using a stylus or touch. In other embodiments, selection of an object may be received by a double click on or near the object using a mouse, or short-cut keys on a keyboard, e.g., up, down, left, right arrow keys. In still other embodiments, selection of an object may be received by visibly or invisibly drawing a shape around the object, e.g., a circular shape.

At focus operation 808, contextual-zoom-focus may be placed on the selected object. For example, contextual-zoom-focus may involve increasing a size of the selected object and repositioning the selected object to a central area of the window. In some cases, contextual-zoom-focus may be animated, i.e., the selected object may perceptively increase in size and glide into a central area of the window. In other cases, contextual-zoom-focus may be immediate, i.e., the view of the window may quickly transition, or flash, to displaying an enlarged form of the selected object in a central area of the window.

At display context operation 810, context for the selected object may be displayed in the window. For example, to provide context for the selected object, at least one other object of the plurality of objects may be partially displayed in the window. For example, when contextual-zoom-focus is placed on an object, context for the contextual-zoom-focused object with respect to the plurality of objects may be preserved. For example, as described above, the plurality of objects may be arranged with respect to one another. Moreover, in embodiments, the arrangement of the plurality of objects may be fixed such that increasing the sizes of the plurality of objects in a smart-zoom-focus view does not alter the positions of the objects with respect to one another. Accordingly, context for the contextual-zoom-focused object with respect to the plurality of objects may be preserved by at least partially displaying one or more objects that are positioned near the contextual-zoom-focused object within the arrangement. In other embodiments, e.g., when objects are not displayed near other objects or the content comprises a single object, context may be preserved by displaying at least some white space around the selected object in the window. In embodiments, "white space" comprises any background for the content in the window (e.g., any background pattern, background color, background image, etc.) and need not be a "white" color.

In embodiments, to allow for context, contextual-zoom-focus may be placed on an object such that the object fills up to about 64% of a window. In other embodiments, contextual-zoom-focus may be placed on an object such that the object fills a majority of a window, e.g., more than about 50% but less than about 64% of the window. In still other embodiments, an object in contextual-zoom-focus may fill any suitable portion of a window such that the object is emphasized or highlighted within the window, but context with respect to the object is maintained. According to further embodiments, upon receiving a selection to place an object in contextual-zoom-focus, calculations may be made to determine an extent to which the size of the selected object should be increased in order to display the selected object along with context in the window.

At decision operation 812, it is determined whether an additional selection of an object was received. For example, selection of an object may be received by a double tap on or near the object using a stylus or touch. In other embodiments, selection of an object may be received by a double click on or near the object using a mouse or short-cut keys on a keyboard. In still other embodiments, selection of an object may be received by visibly or invisibly drawing a shape around the object, e.g., a circular shape. If an additional selection of an object was received, the method proceeds to contextual-zoom-focus operation 808. In this case, depending on whether the selection is a double tap or a single tap, for instance, ultra-focus may be initiated, as discussed with reference to FIG. 2C, or a shift in contextual-zoom-focus may be initiated, as discussed with reference to FIG. 1C. If an additional selection of an object was not received, the method proceeds to decision operation 814.

At decision operation 814, it is determined whether a selection to return to displaying the content having one or more objects was received, i.e., a return to normal view. For example, a selection to return to normal view from contextual-zoom-focus view may include a double tap or click in white space within the window. For example, when returning to normal view, a size of the smart-zoom-focused object and sizes of other objects may decrease. Additionally, a position of the contextual-zoom-focused object may shift from the central area of the window to its original position in the arrangement of the content. In embodiments, returning to normal view comprises returning to an original view of the content in the window. Additionally, returning to normal view may be animated and the contextual-zoom-focused object may perceptively decrease in sized and glide from the central area of the window to its original position. In other cases, the return to normal view may be immediate, i.e., the view of the window may quickly transition, or flash, from displaying the contextual-zoom-focused object in a central area of window to displaying a diminished form of the contextual-zoom-focused object in its original position. If a selection to return to normal view was received, the method proceeds to display operation 804. If a selection to return to normal view was not received, the method proceeds to end operation 816.

At end operation 816, the method of FIG. 8 may be terminated via any suitable means. For example, end operation 816 may involve closing a presentation application or other application for displaying or presenting content. According to embodiments, end operation 816 does not in any way prevent conducting begin operation 802 again at some future time.

Figure 9:
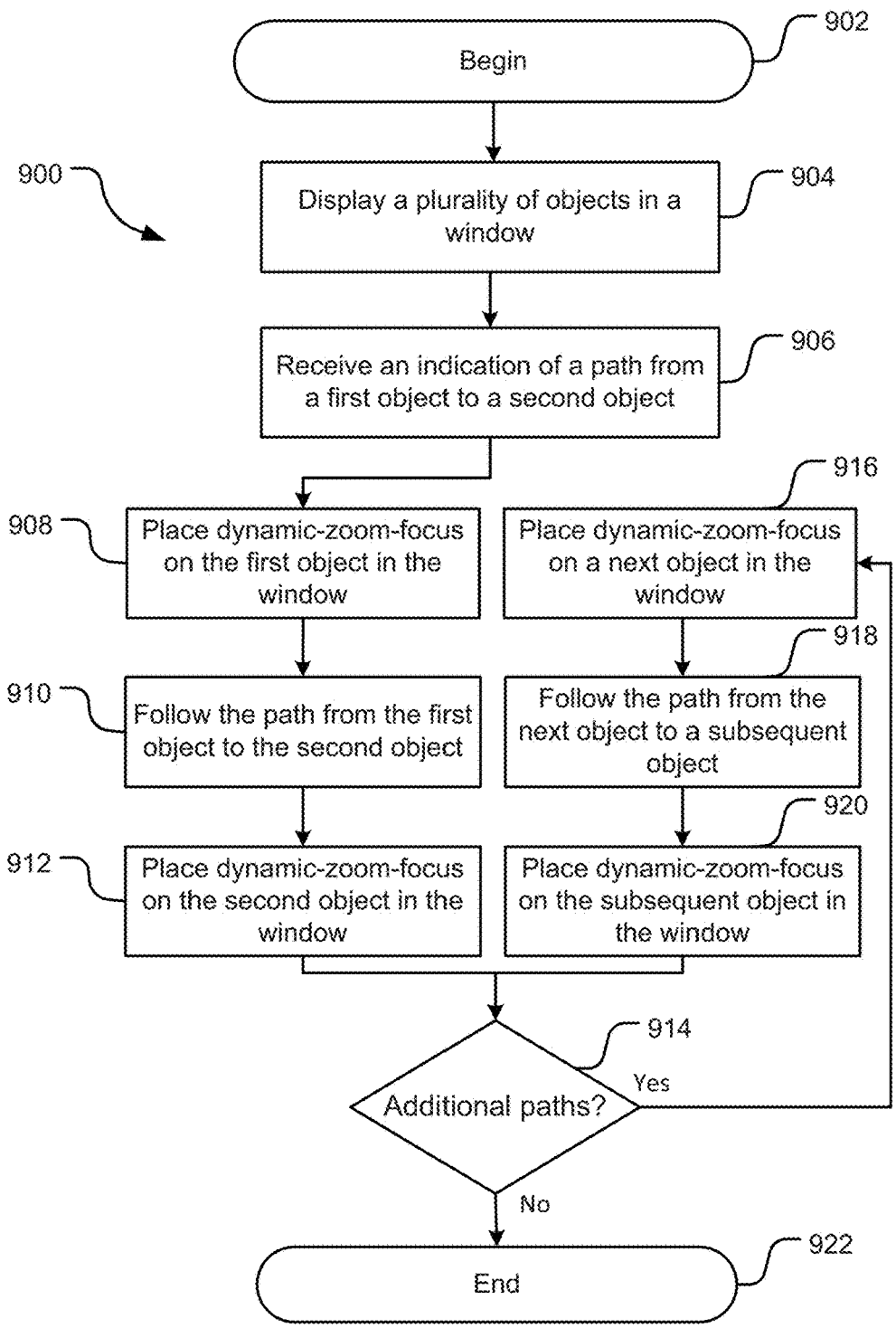
FIG. 9 is a flow diagram representing an embodiment of a method for displaying content with dynamic zoom focus.

FIG. 9 is a flow diagram representing an embodiment of a method for displaying content with dynamic zoom focus.

The method 900 of FIG. 9 begins with begin operation 902. Begin operation 902 may refer to any suitable initiation of a method for displaying content with dynamic zoom focus. For example, begin operation may initiate a presentation application or other application for displaying or presenting content.

At display operation 904, a plurality of objects may be displayed in a window, e.g., a window associated with a computing device. According to some embodiments, the plurality of objects is displayed in a configuration, or an arrangement, within the window. That is, with respect to an object of the plurality of objects, some objects are displayed near the object and other objects are displayed farther away from the object in the arrangement.

At receive operation 906, an indication of a path for progressively displaying a first object and a second object within the content may be received. In embodiments, the indication of the path may consist of a visible or an invisible line, e.g., drawn by a stylus or by touch, between the first and second objects. In some cases, the indication of the path may consist of a substantially straight line between the first and second objects. Alternatively, the indication of the path may consist of a substantially curved or twisted line between the first and second objects. In some embodiments, an indication of a path may be received in an edit mode, and in other embodiments, the indication of the path may be received in a presentation mode.

At focus operation 908, dynamic-zoom-focus may be placed on the first object. For example, dynamic-zoom-focus may involve increasing a size of the first object, and repositioning the first object to a central area of the window, and maintaining context for the first object. In some cases, dynamic-zoom-focus may be animated, i.e., the first object may perceptively increase in size and glide into a central area of the window. In other cases, dynamic-zoom-focus may be immediate, i.e., the view of the window may quickly transition, or flash, to displaying an enlarged form of the first object in a central area of the window.

At follow operation 910, a path may be followed from the first object to the second object. In order to follow the path, in embodiments, dynamic-zoom-focus may glide away from the first object along the path toward the second object. In embodiments, the view may be continuously adjusted such that the path falls in the central area of the window as content is displayed. Accordingly, in embodiments, content along the path and on either side of the path is displayed in the window, providing context within the content. However, the path itself may not be displayed in the window. Additionally, for example, the view may glide along the path at a particular rate, e.g., a default rate or a rate selected by a user.

At focus operation 912, dynamic-zoom-focus may be placed on the second object. For example, dynamic-zoom-focus may involve repositioning the second object to a central area of the window and maintaining context for the second object in the window. In some cases, dynamic-zoom-focus may be animated, i.e., the second object may perceptively glide into a central area of the window.

At decision operation 914, it is determined whether an additional indication of a path was received. If an additional indication of a path was received, the method proceeds to focus operation 916. If an additional indication of a path was not received, the method proceeds to end operation 922.

At focus operation 916, dynamic-zoom-focus may be placed on a next object. For example, dynamic-zoom-focus may involve increasing a size of the next object, repositioning the next object to a central area of the window, and maintaining context for the next object in the window. In some cases, dynamic-zoom-focus may be animated, i.e., the next object may perceptively increase in size and glide into a central area of the window. In other cases, dynamic-zoom-focus may be immediate, i.e., the view of the window may quickly transition, or flash, to displaying an enlarged form of the next object in a central area of the window.

At follow operation 918, a path may be followed from the next object to a subsequent object. In order to follow the path, in embodiments, dynamic-zoom-focus may glide away from the next object along the path toward the subsequent object. In embodiments, the view may be continuously adjusted such that the path falls in the central area of the window as content is displayed. Accordingly, in embodiments, content along the path and on either side of the path is displayed in the window, providing context within the content. However, the path itself (i.e., a line) may not be displayed in the window. Additionally, for example, the view may glide along the path at a particular rate, e.g., a default rate or a rate selected by a user.

At focus operation 920, dynamic-zoom-focus may be placed on the subsequent object. For example, dynamic-zoom-focus may involve repositioning the subsequent object to a central area of the window and maintaining context for the subsequent object in the window. In some cases, dynamic-zoom-focus may be animated, i.e., the subsequent object may perceptively glide into a central area of the window.

At end operation 922, the method of FIG. 9 may be terminated via any suitable means. For example, end operation 922 may involve closing a presentation application or other application for displaying or presenting content. According to embodiments, end operation 922 does not in any way prevent conducting begin operation 902 again at some future time.

Figure 10:
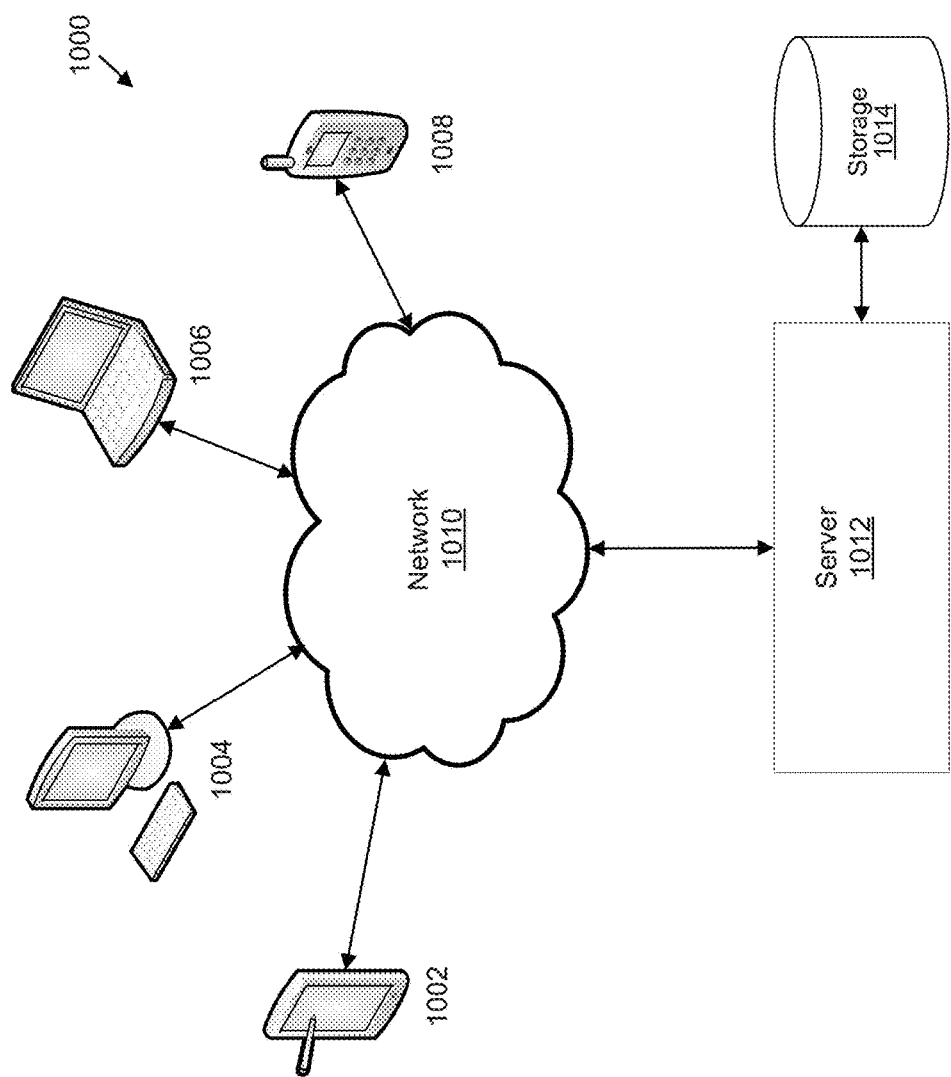
FIG. 10 illustrates a system for displaying content with contextual zoom focus and/or dynamic zoom focus.

FIG. 10 illustrates a system for displaying content with smart zoom focus (i.e., contextual zoom focus and/or dynamic zoom focus).

The system 1000 includes a first client 1002, a second client 1004, a third client 1006, and a fourth client 1008. Although four clients are shown, it is contemplated that fewer or additional clients may access the server 1012 through the network connection 1010. In some embodiments, one or more of clients 1002-1008 are computing devices capable of displaying or presenting content locally and for placing contextual-zoom-focus and/or dynamic zoom focus on one or more elements of the content, as described with reference to FIGS. 1A-6B above. In other embodiments, one or more of clients 1002-1008 are capable of displaying or presenting content by communicating with one or more of clients 1002-1008 via the network connection 1010. In still other embodiments, clients 1002-1008 are capable of displaying or presenting content by communicating with server 1012 via a web browser over network connection 1010. In some embodiments, one or more servers 1012 may be used to implement aspects of the disclosure.

Figure 11:
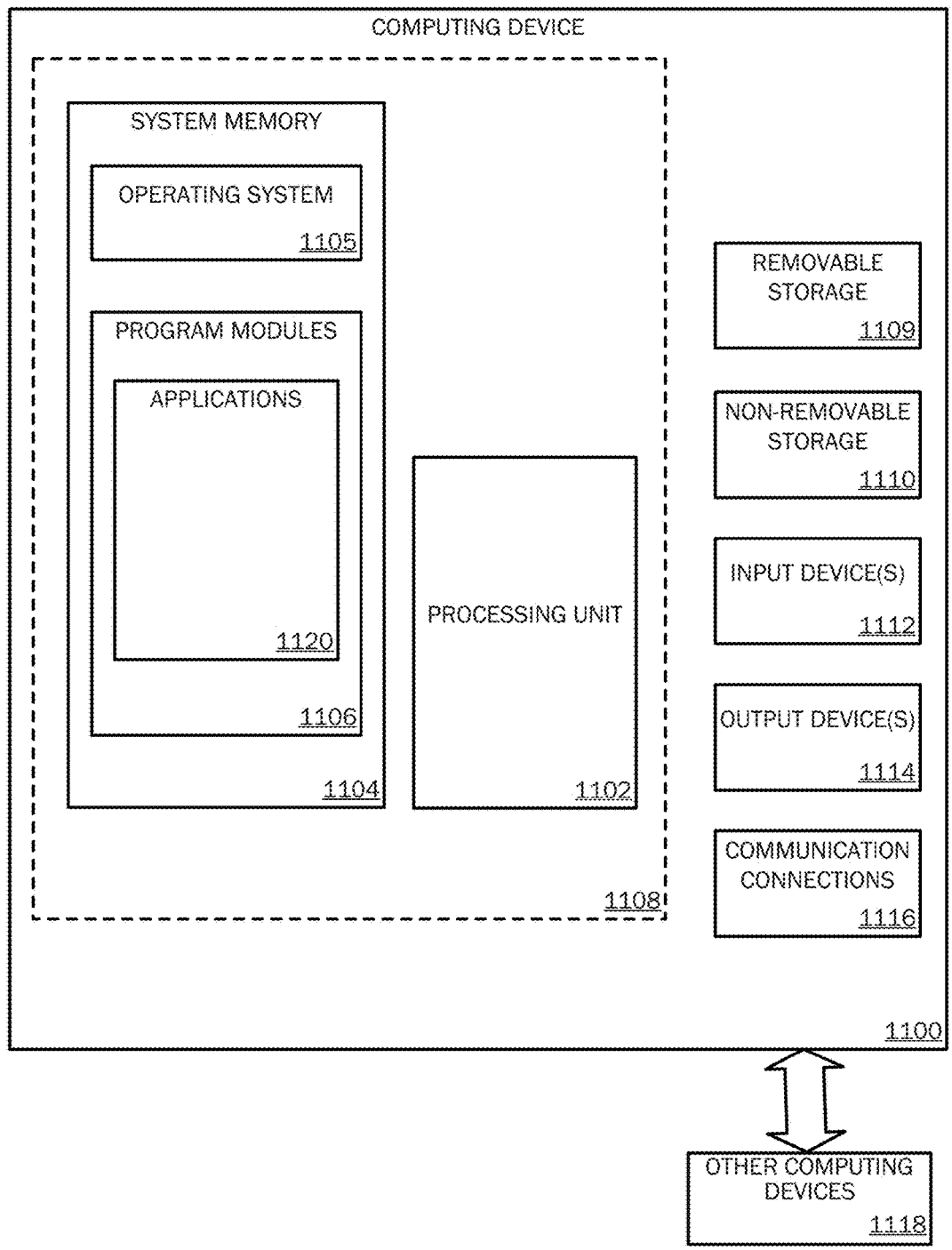
FIG. 11 is a block diagram illustrating physical components of a computing device with which embodiments of the disclosure may be practiced.

FIG. 11 is a block diagram illustrating physical components (i.e., hardware) of a computing device with which embodiments of the disclosure may be practiced.

The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as a presentation application. The operating system 1105, for example, may be suitable for controlling the operation of the computing device 1100 in order to display or present content. Furthermore, embodiments may be practiced in conjunction with a graphics library, other operating systems, or any other application program and is not limited to any particular application or system. This basic configuration is illustrated in FIG. 11 by those components within a dashed line 1108.

The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., a presentation application) may perform processes including, but not limited to, one or more of the stages of the methods 800-900 illustrated in FIGS. 8-9. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the presentation application may be operated via application-specific logic integrated with other components of the computing device 1100 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. For example, computing device 1100 may further comprise an input/output (I/O) device such as a touch screen. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The embodiments and functionalities described herein may operate via a multitude of computing systems including, without limitation, wired and wireless computing systems, mobile computing systems (e.g., mobile telephones, netbooks, tablet or slate type computers, and laptop computers).

Figure 12:
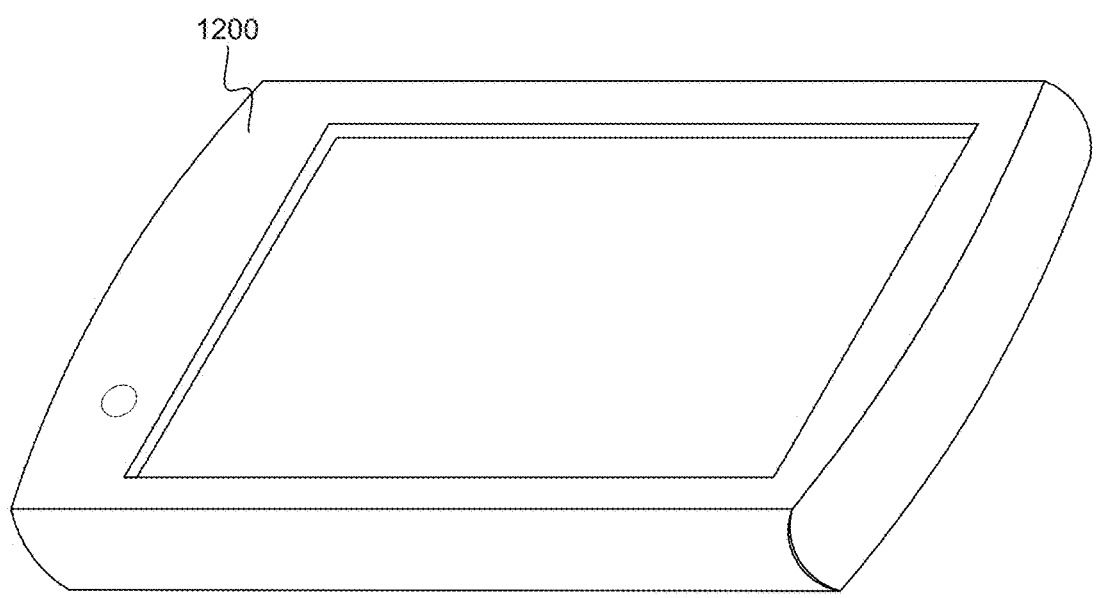
FIG. 12 illustrates an exemplary tablet computing device 1200 that may execute one or more embodiments disclosed herein.

FIG. 12 illustrates an exemplary tablet computing device 1200 that may execute one or more embodiments disclosed herein.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 13:
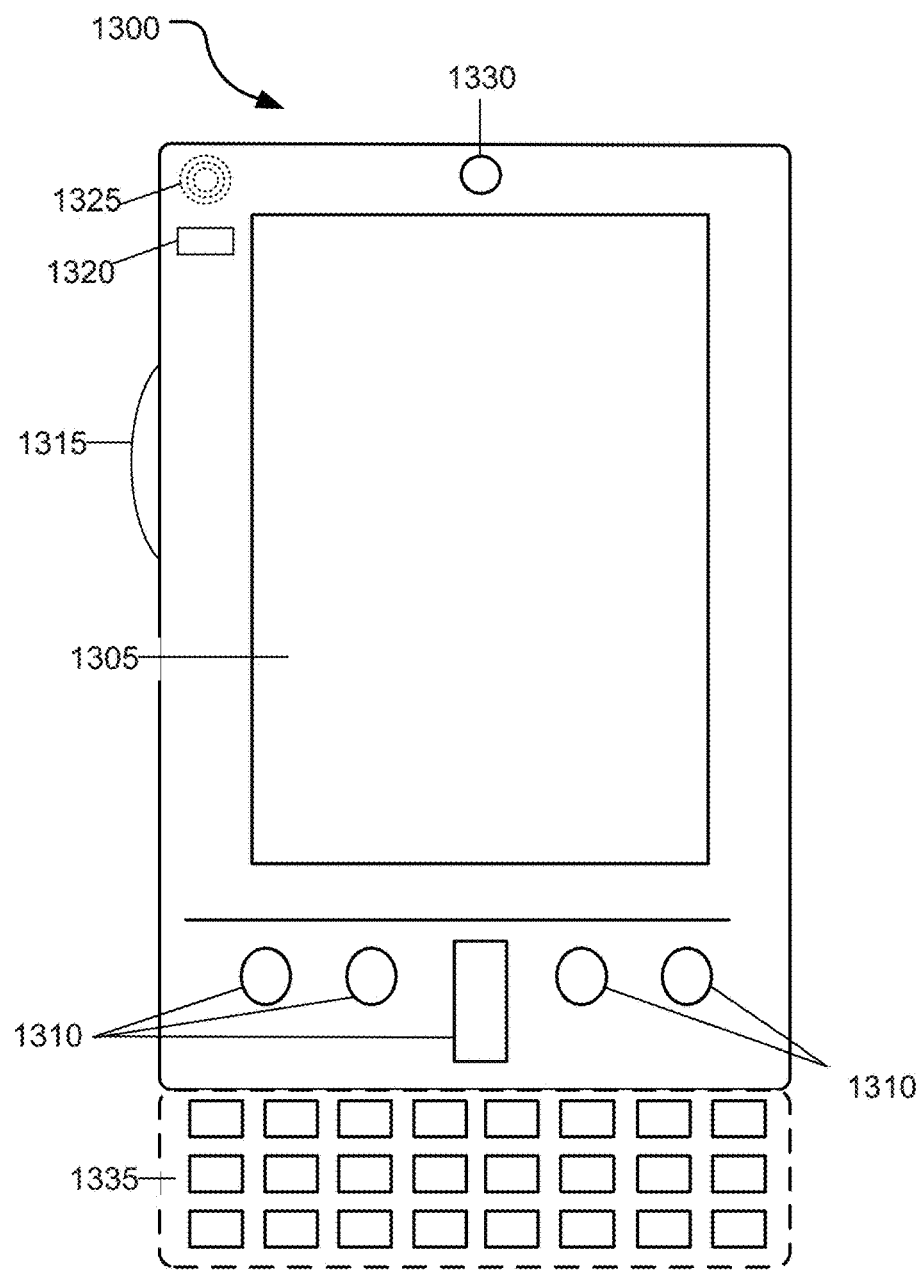
FIG. 13 illustrates a mobile computing device 1300, for example, a mobile telephone, a smart phone, a tablet personal computer, a laptop computer, and the like, with which embodiments of the present disclosure may be practiced.

FIG. 13 illustrates a mobile computing device 1300, for example, a mobile telephone, a smart phone, a tablet personal computer, a laptop computer, and the like, with which embodiments of the present disclosure may be practiced.

With reference to FIG. 13, one embodiment of a mobile computing device 1300 for implementing the embodiments is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative embodiments, mobile computing device 1300 may incorporate more or less input elements. For example, the display 1305 may not be a touch screen in some embodiments.

In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 1305 for showing a graphical user interface (GUI), a visual indicator 1320 (e.g., a light emitting diode), and/or an audio transducer 1325 (e.g., a speaker). In some embodiments, the mobile computing device 1300 incorporates a vibration transducer for providing the user with tactile feedback. In yet another embodiment, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

Figure 14:
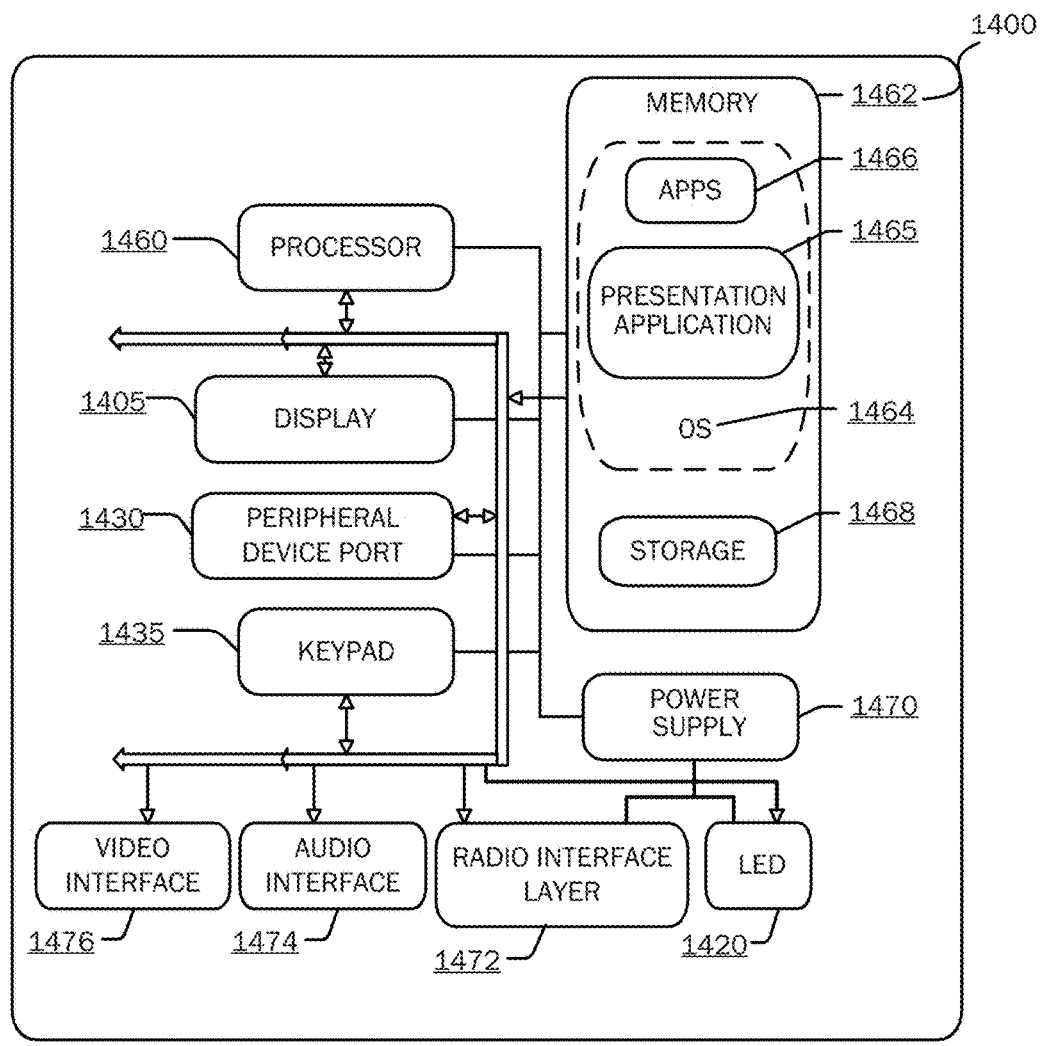
FIG. 14 is a block diagram illustrating the architecture of one embodiment of a mobile computing device.

FIG. 14 is a block diagram illustrating the architecture of one embodiment of a tablet computing device 1200 or a mobile computing device 1300.

That is, the tablet computing device 1200 or the mobile computing device 1300 can incorporate a system (i.e., an architecture) 1400 to implement some embodiments. In one embodiment, the system 1400 is implemented as a "smart phone" capable of running one or more applications (e.g., browser, e-mail, calendaring, contact managers, messaging clients, games, and media clients/players). In some embodiments, the system 1400 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1400 also includes a non-volatile storage area 1468 within the memory 1462. The non-volatile storage area 1468 may be used to store persistent information that should not be lost if the system 1400 is powered down. The application programs 1466 (e.g., presentation application 1465) may use and store information in the non-volatile storage area 1468, such as e-mail or other messages used by an e-mail application, and the like. A synchronization application (not shown) also resides on the system 1400 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the tablet computing device 1200 or the mobile computing device 1300, including a presentation application 1465 described herein.

The system 1400 has a power supply 1470, which may be implemented as one or more batteries. The power supply 1470 might further include an external power source, such as an AC adapter or a powered docking cradle that supplements or recharges the batteries.

The system 1400 may also include a radio 1472 that performs the function of transmitting and receiving radio frequency communications. The radio 1472 facilitates wireless connectivity between the system 1400 and the "outside world," via a communications carrier or service provider. Transmissions to and from the radio 1472 are conducted under control of the operating system 1464. In other words, communications received by the radio 1472 may be disseminated to the application programs 1466 via the operating system 1464, and vice versa.

The visual indicator 1420 may be used to provide visual notifications, and/or an audio interface 1474 may be used for producing audible notifications via an audio transducer. In the illustrated embodiment, the visual indicator 1420 is a light emitting diode (LED) and the audio transducer is a speaker. These devices may be directly coupled to the power supply 1470 so that when activated, they remain on for a duration dictated by the notification mechanism even though the processor 1460 and other components might shut down for conserving battery power. The LED 1420 may be programmed to remain on indefinitely until the user takes action to indicate the powered-on status of the device. The audio interface 1474 is used to provide audible signals to and receive audible signals from the user. For example, in addition to being coupled to the audio transducer, the audio interface 1474 may also be coupled to a microphone to receive audible input, such as to facilitate a telephone conversation. In accordance with embodiments, the microphone may also serve as an audio sensor to facilitate control of notifications, as will be described below. The system 1400 may further include a video interface 1476 that enables an operation of an on-board camera 1430 to record still images, video stream, and the like.

A tablet computing device 1200 or mobile computing device 1300 implementing the system 1400 may have additional features or functionality. For example, the tablet computing device 1200 or mobile computing device 1300 may also include additional data storage devices (removable and/or non-removable) such as, magnetic disks, optical disks, or tape. Such additional storage is illustrated in FIG. 14 by the non-volatile storage area 1468.

Data/information generated or captured by the tablet computing device 1200 or mobile computing device 1300 and stored via the system 1400 may be stored locally on the tablet computing device 1200 or mobile computing device 1300, as described above, or the data may be stored on any number of storage media that may be accessed by the device via the radio 1472 or via a wired connection between the tablet computing device 1200 or mobile computing device 1300 and a separate computing device, for example, a server computer in a distributed computing network, such as the Internet. As should be appreciated such data/information may be accessed via the tablet computing device 1200 or mobile computing device 1300 via the radio 1472 or via a distributed computing network. Similarly, such data/information may be readily transferred between computing devices for storage and use according to well-known data/information transfer and storage means, including electronic mail and collaborative data/information sharing systems.

Embodiments of the present disclosure, for example, are described above with reference to block diagrams and/or operational illustrations of methods, systems, and computer program products according to embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode recited by the claims. The claims should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A computer-implemented method for displaying content having a plurality of objects, the method comprising:
   displaying the plurality of objects in a window, the plurality of objects having an arrangement;
   receiving an indication of a path from a first object to a second object of the plurality of objects, wherein the first object is positioned near at least one other object within the arrangement, wherein the second object is positioned near at least one different object within the arrangement, and wherein the indication of the path comprises one of a curved line and a straight line drawn between the first object and the second object in the window;
   placing dynamic-zoom-focus on the first object in the window, comprising:
      automatically calculating a first change in size for the first object in order to display the first object and at least a portion of the at least one other object within a predetermined area of the window, wherein the calculated first change in size preserves context for the first object with respect to the plurality of objects by accounting for at least partial display of the at least one other object positioned near the first object within the arrangement;
      resizing the first object based on the calculated first change in size; and
      repositioning the first object in a central area of the window;
   gliding a view within the window along the path from the first object to the second object, wherein gliding the view along the path comprises adjusting the view in the window such that the path falls in a central area of the window along with one or more of the plurality of objects during the gliding; and
   placing dynamic-zoom-focus on the second object in the window, comprising:
      automatically calculating a second change in size for the second object in order to display the second object and at least a portion of the at least one different object within the predetermined area of the window, wherein the calculated second change in size preserves context for the second object with respect to the plurality of objects by accounting for at least partial display of the at least one different object positioned near the second object within the arrangement, and wherein the calculated second change in size is different than the calculated first change in size;
      resizing the second object based on the calculated second change in size; and
      repositioning the second object in the central area of the window.

2. The computer-implemented method of claim 1, wherein receiving the indication of the path from the first object to the second object comprises one of:

receiving a touch indication of the path;
receiving a stylus indication of the path;
receiving an indication of the path using an input device comprising one of: a mouse and a keyboard; and
automatically generating the path upon selection of the second object.

3. The computer-implemented method of claim 2, wherein the touch indication of the path further comprises substantially enclosing the first object and then substantially enclosing the second object using touch.

4. The computer-implemented method of claim 2, wherein the stylus indication of the path further comprises substantially enclosing the first object and then substantially enclosing the second object using a stylus.

5. The computer-implemented method of claim 2, wherein the indication of the path further comprises selecting the first object and then selecting the second object using an input device.

6. The computer-implemented method of claim 3, further comprising:
receiving a connector between the substantially enclosed first object and the substantially enclosed second object.

7. The computer-implemented method of claim 1, wherein the indication of the path from the first object to the second object is received during an edit mode.

8. The computer-implemented method of claim 1, wherein placing dynamic-zoom-focus on the first object, gliding a view within the window along the path, and placing dynamic-zoom-focus on the second object occurs based on predetermined timing.

9. The computer-implemented method of claim 1, wherein placing dynamic-zoom-focus on the first object, gliding a view within the window along the path, and placing dynamic-zoom-focus on the second object occurs based on receiving a control input.

10. The computer-implemented method of claim 1, wherein the indication of the path from the first object to the second object is received during a presentation mode.

11. The computer-implemented method of claim 1, wherein placing dynamic-zoom-focus on the first object comprises:
increasing a size of the first object based on the calculated first change in size; and
repositioning the first object to a central portion of the window.

12. A computer storage device having computer-readable instructions stored thereon that when executed by a processor cause a computer system to:
display an object in a window, wherein the object comprises one or more elements in a first arrangement, and wherein at least one of the one or more elements comprises one or more sub-elements in a second arrangement;
receive an indication of a first path from a first element to a second element of the one or more elements, wherein the first element is positioned near at least one other element within the first arrangement, wherein the second element is positioned near at least one different element within the first arrangement, and wherein the indication of the first path comprises one of a curved line and a straight line drawn between the first element and the second element in the window;
place dynamic-zoom-focus on the first element in the window, comprising:
automatically calculate a first change in size for the first element in order to display the first element and at least a portion of the at least one other element within a predetermined area of the window, wherein the calculated first change in size maintains context for the first element with respect to the one or more elements by accounting for at least partial display of the at least one other element positioned near the first element within the first arrangement;
resize the first element based on the calculated first change in size; and
reposition the first element in a central area of the window;
glide a view within the window along the first path from the first element to the second element, wherein gliding the view along the path comprises adjusting the view in the window such that the path falls in a central area of the window along with one or more of the plurality of objects during the gliding; and
place dynamic-zoom-focus on the second element in the window, comprising:
automatically calculate a second change in size for the second element in order to display the second element and a least a portion of the at least one different element within the predetermined area of the window, wherein the calculated second change in size preserves context for the second element with respect to the one or more elements by accounting for at least partial display of the at least one different element positioned near the second element within the first arrangement, and wherein the calculated second change in size is different than the calculated first change in size;
resize the second element based on the calculated second change in size; and
reposition the second element in the central area of the window.

13. The computer storage device of claim 12, further comprising:
receive an indication of a second path from a first sub-element to a second sub-element of the second element;
place dynamic-zoom-focus on the first sub-element in the window;
glide a view within the window along the second path from the first sub-element to the second sub-element; and
place dynamic-zoom-focus on the second sub-element in the window.

14. The computer storage device of claim 12, wherein receiving the indication of the first path comprises one of:
receive a touch indication of the first path;
receive a stylus indication of the first path;
receive an indication of the first path using an input device comprising one of: a mouse and a keyboard; and
automatically generate the first path upon selection of the second sub-element.

15. The computer storage device of claim 14, wherein the indication of the first path further comprises substantially enclosing the first element and then substantially enclosing the second element.

16. A computer system comprising:
at least one processing unit; and
at least one memory having computer-readable instructions stored thereon that, when executed by the at least one processing unit, cause the computer system to:
display a plurality of objects in a window, the plurality of objects having an arrangement;
receive an indication of a path from a first object to a second object of the plurality of objects, wherein the first object is positioned near at least one other object within the arrangement, wherein the second object is positioned near at least one different object within the arrangement, and wherein the indication of the path comprises one of a curved line and a straight line drawn between the first object and the second object in the window;

place dynamic-zoom-focus on the first object in the window, comprising:
  automatically calculate a first change in size for the first object in order to display the first object and at least a portion of the at least one other object within a predetermined area of the window, wherein the calculated first change in size preserves context for the first object with respect to the plurality of objects by accounting for at least partial display of the at least one other object positioned near the first object within the arrangement;
  resize the first object based on the calculated first change in size; and
  reposition the first object in a central area of the window;

glide a view within the window along the path from the first object to the second object, wherein gliding the view along the path comprises adjusting the view in the window such that the path falls in a central area of the window along with one or more of the plurality of objects during the gliding; and place dynamic-zoom-focus on the second object in the window, comprising:
  automatically calculate a second change in size for the second object in order to display the second object and at least a portion of the at least one different object within the predetermined area of the window, wherein the calculated second change in size preserves context for the second object with respect to the plurality of objects by accounting for at least partial display of the at least one different object positioned near the second object within the arrangement, and wherein the calculated second change in size is different than the calculated first change in size;
  resize the second object based on the calculated second change in size; and
  reposition the second object in the central area of the window.

17. The computer system of claim 16, wherein placing dynamic-zoom-focus on the first object comprises:
  increase a size of the first object based on the calculated first change in size;
  reposition the first object to a central portion of the window; and
  maintain context for the first object in the window.

18. The computer system of claim 16, wherein the indication of the path from the first object to the second object is received during an edit mode.

19. The computer system of claim 16, wherein the indication of the path from the first object to the second object is received during a presentation mode.

20. The computer system of claim 16, wherein placing dynamic-zoom-focus on the first object, gliding a view within the window along the path, and placing dynamic-zoom-focus on the second object occurs based on predetermined timing.

* * * * *